United States Patent
Bell

(10) Patent No.: US 11,163,314 B1
(45) Date of Patent: Nov. 2, 2021

(54) CONTENTION MANAGEMENT FOR MOBILE DRIVE UNITS

(71) Applicant: Amazon Technologies, Inc., Seattle, WA (US)

(72) Inventor: Matthew Paul Bell, Newton, MA (US)

(73) Assignee: Amazon Technologies, Inc., Seattle, WA (US)

(*) Notice: Subject to any disclaimer, the term of this patent is extended or adjusted under 35 U.S.C. 154(b) by 741 days.

(21) Appl. No.: 15/907,069

(22) Filed: Feb. 27, 2018

(51) Int. Cl.
*G05D 1/02* (2020.01)
*G05D 1/00* (2006.01)

(52) U.S. Cl.
CPC ......... *G05D 1/0289* (2013.01); *G05D 1/0088* (2013.01); *G05D 1/0297* (2013.01); *G05B 2219/31003* (2013.01); *G05D 2201/0216* (2013.01)

(58) Field of Classification Search
CPC ......... G05D 1/0289; G05D 2201/0216; G05D 1/0297; G05D 1/0088; G05B 2219/31003
See application file for complete search history.

(56) References Cited

U.S. PATENT DOCUMENTS

| | | | |
|---|---|---|---|
| 7,873,469 B2 | 1/2011 | D'Andrea et al. | |
| 7,920,962 B2 | 4/2011 | D'Andrea et al. | |
| 10,126,747 B1 | 11/2018 | Svec et al. | |
| 2008/0009965 A1 | 1/2008 | Bruemmer et al. | |
| 2013/0302132 A1* | 11/2013 | D'Andrea | G06Q 10/08 414/807 |
| 2017/0017236 A1* | 1/2017 | Song | G08G 1/165 |
| 2017/0194181 A1* | 7/2017 | Chen | H01F 7/20 |
| 2017/0285648 A1 | 10/2017 | Welty et al. | |
| 2017/0357270 A1 | 12/2017 | Russell | |
| 2018/0178382 A1 | 6/2018 | Lalonde et al. | |
| 2019/0073904 A1* | 3/2019 | Heinla | G05D 1/0088 |

* cited by examiner

*Primary Examiner* — Mathew Franklin Gordon
(74) *Attorney, Agent, or Firm* — Kilpatrick Townsend & Stockton LLP

(57) ABSTRACT

Systems and methods are provided herein for mitigating contentions between mobile drive units (MDUs) within a workspace. A schedule may be generated that identifies execution steps associated with respective tasks to be performed by each of a plurality of mobile drive units (MDUs) within the workspace. A contention related to a first execution step associated with a first mobile drive unit (MDU) and a second execution step associated with a second MDU may be identified. The schedule may be altered to include an indication of the contention. It may be determined that the first MDU is at the location of the contention. Accordingly, the contended space may be reserved for the first MDU, and the schedule may be modified to restrict the second MDU from executing the second execution step until the first MDU has completed the execution of the first execution step.

20 Claims, 9 Drawing Sheets

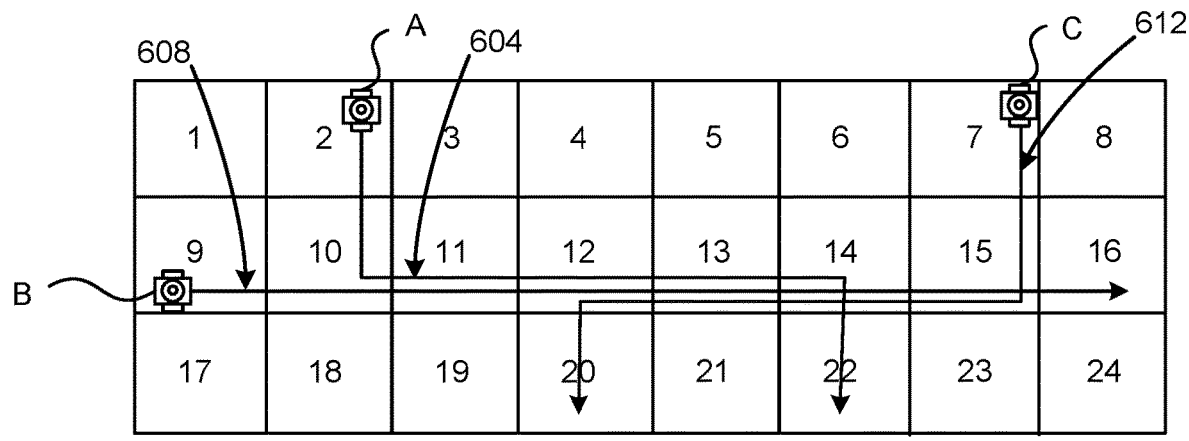
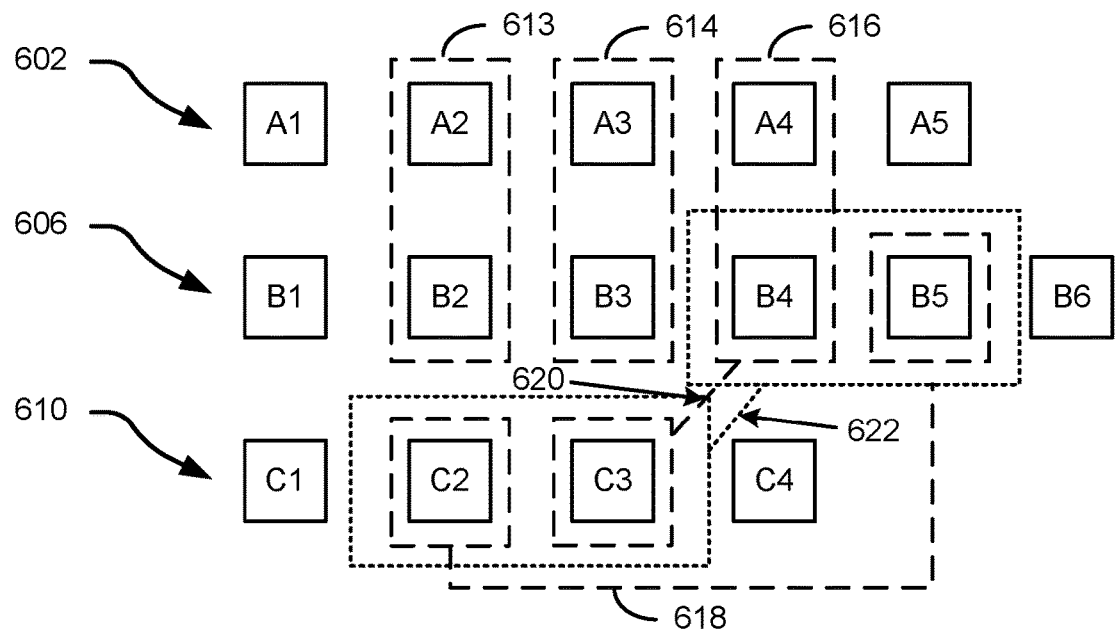
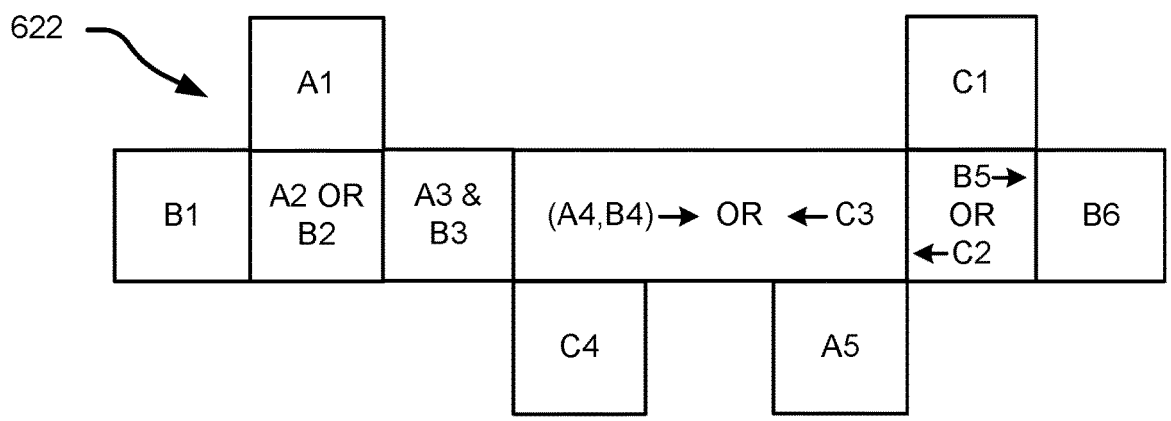
FIG. 6

CONTENTION MANAGEMENT FOR MOBILE DRIVE UNITS

BACKGROUND

Modern inventory systems, such as those in storage facilities (e.g., a warehouse) operated by electronic marketplace providers, face significant challenges with respect to managing items in inventory. While storing items within a storage facility and retrieving items for order fulfillment were once traditionally accomplished by human personnel, it is becoming more common for these functions to be performed by a myriad of robotic devices (e.g., mobile drive units (MDUs)). As these devices travel about the storage facility, they may face contentions with other MDUs (e.g., for space). Current systems may lack effective contention resolution methods for overcoming these contentions.

For example, it may be the case that two MDUs need to cross the same space within a same time window (e.g., at substantially the same time, within a threshold amount of time between the two, etc.) in the course of performing their respective tasks. This may cause the MDUs to compete for the space. Conventionally, two MDUs that contend for the same space may each make a request to a common management system to reserve the space. In some scenarios, the common management system may deny both requests initially. Each mobile drive unit (MDU) may select a random time period during which it will wait before submitting a new request for the space. Because the time periods of two contending MDUs are random, the likelihood of addition contention upon the elapse of the time periods is very low and, thus, the contention is resolved. However, this approach may lead to performance inefficiencies as both MDUs may remain stationary while they wait to ascertain if the space is available. Computing new paths to avoid these contentions may lead to delay and even further contentions as the travelable area within the warehouse has decreased.

Accordingly, current techniques may lead to delays in task completion that may negatively affect the performance of the MDUs operating in the storage facility individually, or as a whole. Thus, improvements are needed to address such inefficiencies. Embodiments of the invention address these and other problems, individually and collectively.

BRIEF DESCRIPTION OF THE DRAWINGS

Various embodiments in accordance with the present disclosure will be described with reference to the drawings, in which:

FIG. 6 includes schematic diagrams illustrating example techniques for identifying one or more contentions between two or more MDUs utilizing the drive management module of FIG. 3, in accordance with at least one embodiment;

DETAILED DESCRIPTION

Figure 1:
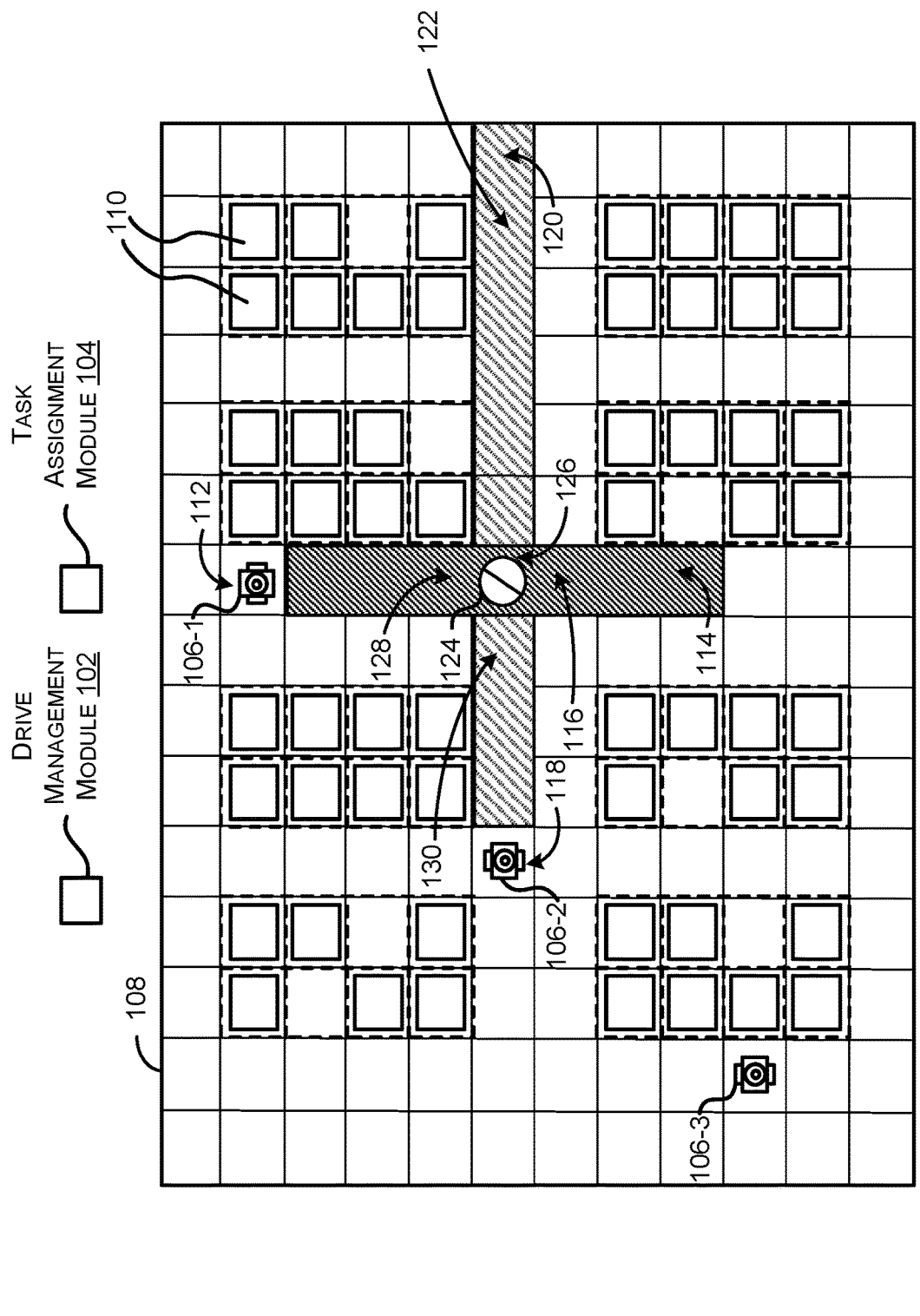
FIG. 1 is a schematic diagram illustrating an example environment suitable for implementing aspects of contention management by a drive management module, in accordance with at least one embodiment.

Techniques described herein are directed to systems and methods for resolving contentions encountered by one or more mobile drive units (MDUs) within a workspace. Although examples throughout may utilize workspaces that include storage facilities (e.g., warehouses) and/or warehouse machinery for illustrative purposes, it should be appreciated that any example herein may be equally applied to other suitable contexts such as facilities in which storage is not a focus. Additionally, the techniques discussed herein may be equally applied in other contexts such as resolving contentions between unmanned/autonomous vehicles operating within a facility or operating independent of a facility as part of a wider area of operation. Thus, a "workspace" may be used herein to refer to a facility that includes a physical structure or as a general area of operation. As used herein, a "contention" is intended to refer situations in which one or more MDUs will be attempting to utilize a same space over a future time window (e.g., at substantially the same future time, within a threshold amount of time between the two, etc.). A "drive management module" may be utilized in various examples herein. A "drive management module" may be a computing system, a device, a hardware module, a software module, or a service responsible for managing task execution and contention management corresponding to any suitable number of MDUs within a workspace.

In some examples, a drive management module may obtain a task schedule corresponding to various plannable activities (e.g., fetch an item, carry an item, store an item, etc.) to be performed by the MDUs. The task schedule may be received from a task assignment module that is external (or internal) with respect to the drive management module. The drive management module may generate a detailed schedule from the task schedule. In some embodiments, the detailed schedule may include a set of execution steps representing a planned execution path for respective MDUs. When corresponding instructions are executed by a respective MDU, the MDU may perform the task. In some embodiments, each execution step may be considered a segment of a planned execution path.

The drive management module may utilize the sets of execution steps (e.g., the planned execution paths) included in the detailed schedule to identify potential contentions between MDUs. For example, the drive management module may compare portions (e.g., one or more execution steps, whole execution paths, etc.) of the MDUs' planned execution paths over a particular time period (e.g., a 30 second time period, a 60 second time period, a two-hour time period, etc.). Through this comparison, potential contentions (e.g., overlaps of two or more planned execution paths) may be identified. A potential contention be identified when two or more MDUs are scheduled to utilize the same volume (e.g., space, area, location, etc.) during substantially the same time period (e.g., the respective time periods during which two or more MDUs are scheduled to utilize the same volume overlap). In some examples, the potential contention may be identified when two or more MDUs are scheduled to utilize the same volume within a time range of each other. That is to say, if one MDU is scheduled to utilize a volume at time t1, and another MDU is scheduled to utilize that same volume at t2, and t2 is within a threshold range of t1 (e.g., within 10 seconds, within 20 second, within 10 minutes, etc.), the scenario may be identified as a potential contention by the drive management module. The drive management module may modify the detailed schedule to include an indication of these potential contentions. As a non-limiting example, a potential contention between a first MDU and a second MDU may be indicated by modifying the detailed schedule to include a dependency for respective execution steps of the first MDU and the second MDU.

The drive management module may utilize the detail schedule to facilitate task execution of the various MDUs. In some embodiments, the drive management module may execute operations to incrementally reserve space within the workspace for an MDU to perform a set of execution steps. Once space has been reserved, the drive management module may instruct the MDU to perform the execution step within the reserved space and in accordance with the detailed schedule.

As the drive management module identifies a next execution step to be performed, it may encounter a dependency within the detailed schedule that indicates a potential contention. In response, the drive management module may utilize the detailed schedule to identify one or more other MDUs that may be involved in the potential contention. In some embodiments, the dependency may indicate a number of MDUs potentially affected by the potential conflict, while in other embodiments, the drive management module may otherwise search the detailed schedule and/or ascertain current locations of other MDUs to determine a number of MDUs that may attempt to utilize the same space/location of the first MDU around the same period of time (e.g., at substantially the same time, within a threshold amount of time between the two, etc.).

In some embodiments, the drive management module may determine an order by which the affected MDUs are to utilize the contended space. This determination may be based on any suitable combinations of factors (e.g., task priority of the tasks assigned to the respective MDUs, respective speeds and/or locations of the respective MDUs, type of execution step to be performed in the contended space by the respective MDUs such as "rotate" versus "travel straight", or the like). Once an order is determined, the drive management module may modify the detailed schedule to indicate the execution order. In some embodiments, the execution order may be indicated and ultimately enforced utilizing one or more dependencies within the detailed schedule. A dependency may indicate that a particular MDU may not commence an execution step until completion of another MDUs execution step (or potentially until the other MDU is no longer utilizing the contended space).

By way of example only, the drive management module may compare some portion of the sets of execution steps (e.g., planned execution paths) of two MDUs (e.g., MDU A and MDU B) from a detailed schedule. For example, the planned execution paths of the respective MDUs may be compared given a particular time period (e.g., a particular 30 second time period) of the detailed schedule. Through the comparison, the drive management module may determine that the planned execution paths overlap. The overlap may indicate that particular execution steps of the respective planned execution paths may attempt to utilize a same space, volume, area, etc. during substantially a sametime period (or within a timing range with respect to one another). Accordingly, the drive management module may modify the detailed schedule to include one or more dependencies that indicate that a contention is to be resolved before either of the MDUs may be instructed to utilize the contended space.

MDU A may be the first to reach the contended space during the performance of its assigned task. The drive management module may determine from the detailed schedule that the next execution step in MDU A's planned execution path is dependent on the resolution of a particular contention. In some examples, the drive management module may determine that MDU B is about to require the contended space to continue performance of its task. The drive management module may determine that because MDU A arrived at the contended space first (e.g., ascertained based on MDU A's current location), or MDU A's next execution step required the contended space first, that MDU A should be assigned the space. It should be appreciated that this is a simplistic example used for illustrative purposes only and that numerous factors may be utilized to determine the order by which the MDUs will utilize the contended space. These factors will be discussed further below with respect to the following figures. Once it has been determined that MDU A is to utilize the contended space first, the drive management module may again modify the schedule in order to restrict MDU B from utilizing the contended space until MDU A has completed its task and/or vacated the contended space. The drive management module may then ensure that MDU A is allowed to continue performance of its task while MDU B is made to wait.

Thus, unlike conventional systems where both MDUs would be blocked for some period of time as the contention was resolved through random wait times, a contention may be dynamically resolved as the contention occurs by determining and enforcing an order and/or timing by which a contended space is to be utilized. In some embodiments, potential contention identification may be limited to relatively short time periods (e.g., the next 30 seconds of execution, the next minute of execution, etc.) in order to reduce the latency involved in identifying such contentions over an entire schedule given many MDUs. Additionally, as MDUs may be delayed during the course of executing their assigned tasks, or have their set of assigned tasks modified, their respective sets of execution steps (e.g., planned execution paths) may change. Thus, limiting contention identification to these relatively short time periods enables the drive management module to avoid needless processing of potential contentions that may never come to pass given such delays.

It should be appreciated that the techniques discussed above are applicable in contexts other that inventory situations. The techniques disclosed herein provide, at least, a system and method for resolving contentions encountered between two or more MDUs of a storage facility. Utilizing the techniques discussed herein, the system described herein may operate more efficiently than conventional systems as task completion delays of the various MDUs may be reduced as a result of providing the contention resolution techniques discussed throughout. By detecting contentions incrementally (e.g., within a relatively short time period such as 30 second intervals), the system may avoid needless processing should delays occur in task completion. Rather than identifying and attempting to resolve every possible contention ahead of execution, the system described herein may identify only a subset of potential contentions within a time period and resolve such contentions as they are actually encountered. Thus, the system may avoid needless processing of contentions further out in the future that may be unlikely to occur. Additionally, the contention resolution techniques may be conducted by multiple drive management modules that each manage a particular region and/or set of MDUs of the facility. Thus, the tasks of detecting and mitigating contentions in the various regions may be conducted in parallel across the facility, and by the multiple drive management modules. Accordingly, utilizing the drive management module(s) improves the overall system throughput (e.g., reducing wait times of MDUs in the system).

FIG. 1 is a schematic diagram illustrating an example environment 100 suitable for implementing aspects of contention management by a drive management module 102, in accordance with at least one embodiment. The environment 100 may include the drive management module 102, an task assignment module 104, and one or more mobile drive units (MDUs) (e.g., the MDUs 106-1, 106-2, and 106-3, collectively referred to as "MDUs 106") operating within a workspace 108 (e.g., a warehouse facility where items are stored, a sortation facility where items are sorted, or the like). The drive management module 102 and the task assignment module 104 may be configured to manage various aspects of the MDUs 106 with the workspace 108. Additional elements within the workspace 108 may include one or more of the receptacles 110. The workspace 108 may include additional elements and/or components not depicted in FIG. 1.

The receptacles 110 may be in various forms. By way of example only, the receptacles 110 may be configured to receive one or more items. Some of the receptacles 110 may include storage locations and/or containers configured to receive and store one or more physical items. For example, the receptacles 110 may include bins, shelves, racks, receptacles, or the like. In some examples, the receptacles 110 may include an opening through which items may be deposited (and potentially transported or directed) to a storage container (e.g., a portable storage container, a stationary storage container, etc.).

In some embodiments, the MDUs may transport any item (e.g., a physical item, the receptacles 110, etc.) between points within a workspace 108. Accordingly, each of the MDUs 106 may be capable of moving items between locations within the workspace 108 to facilitate the entry, processing, sortation, storage management, and/or removal of items within the workspace 108 and the completion of other tasks involving items.

As a non-limiting example, the workspace 108 may include an elevated floor upon which the MDUs 106 may operate. The receptacles 110 may include an opening within the elevated floor of workspace 108 through which items may be deposited by the MDUs 106. In some examples, the floor may or may not be elevated and the receptacles 110 may include an opening (e.g., directed upward or downward) through which items may be deposited. Storage containers (not depicted) may be placed near to (e.g., below, above, etc.), or may otherwise be attached to, the receptacles 110. An item may be deposited into the receptacles 110 and transported (e.g., via a shoot, a conveyor belt, another MDU/transportation device, or the like) to a storage container (e.g., a bin, a crate, a vehicle, or the like). The storage container may store the item on a temporary or permanent basis.

As another non-limiting example, the receptacles 110 may include a storage container on which one or more items may be placed for storage. The receptacles 110 may be a shelving system and/or a storage container having any suitable number of storage containers within which the MDUs 106 may place various items. Each storage container within the receptacles 110 may be associated with an identifier that identifies the particular storage container within the receptacles 110.

In at least one embodiment, the task assignment module 104 may assign tasks to appropriate components of workspace 108 (e.g., the MDUs 106) and coordinates operation of the various components in completing the tasks. Although shown in FIG. 1 as a single, discrete component, the task assignment module 104 may represent multiple components and may represent or include portions of the MDUs 106 or other components of the environment 100 (e.g., one or more components of the drive management module 102). The task assignment module 104 may be internal or external to the workspace 108. In some examples, the task assignment module 104 may be communicatively connected to various components of the environment 100 (e.g., the drive management module 102) via one or more networks (e.g., the Internet, a local area network, a cellular network, or the like).

The MDUs 106 may represent any devices or components appropriate for use in the workspace 108 based on the characteristics and configuration of the receptacles 110 and/or other components of workspace 108. In a particular embodiment of environment 100, the MDUs 106 represent independent, self-powered devices configured to freely move about the workspace 108. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. The MDUs 106 may be communicatively coupled to the drive management module 102 and/or the task assignment module 104 via any suitable communication means and according to any suitable communications protocol. It should be appreciated that the examples described herein, may similarly be utilized by any suitable device that is configured to utilize space to move, regardless of whether or not it is able to freely move about the workspace 108. Thus, the techniques herein may equally be applied to devices other than MDUs, such as robotic arms, for example.

The workspace 108 of FIG. 1 represents an area within which the MDUs 106 can move. For example, the workspace 108 may represent all or part of the floor of a mail-order warehouse and/or a sortation facility in which the MDUs 106 operate. Although FIG. 1 shows, for the purposes of illustration, a workspace 108 that includes a fixed, predetermined, and finite physical space, the workspace 108 may have variable dimensions and/or an arbitrary geometry. While FIG. 1 is intended to illustrate a particular embodiment in which the workspace 108 is entirely enclosed in a building, the workspace 108 may be unconstrained by any fixed structure.

In operation, the task assignment module 104 may select particular MDUs of the MDUs 106 to perform particular tasks. Once a task (or many tasks) are assigned, the task assignment module 104 may provide a task schedule to the drive management module 102. A task schedule may include one or more sub-tasks of the assigned task. By way of example only, a task of storing a newly received item may include sub-tasks including retrieving the item from a particular location and delivering the item to a particular location (e.g., one of the receptacles 110).

In some embodiments, the drive management module 102 may generate a more-detailed schedule for each task utilizing the task schedule. That is, the drive management module 102 may determine a set of execution steps/operations to be performed in order to execute each sub-task of the assigned task. The set of execution steps/operations may include navigational operations related to speed, heading, rotational motion, and the like. The set of execution steps/operation may additionally or alternatively include steps/operations related to operating any suitable component of an MDU (e.g., mechanical devices such as conveyor belts, mechanical arm(s), onboard sensors, etc.). It should be appreciated that a set of execution steps/operations for performing a task and/or sub-task may include a greater number or a fewer number of operations than the examples provided depending on the particular task/sub-task involved, the particular MDU assigned, and/or the particular workspace utilized.

As part of a determination of what execution steps/operations are to be performed the drive management module 102 may, among other things, determine a planned execution path for performing the assigned task/sub-task. The planned execution path may be determined based at least in part on the task/sub-task to be executed and/or the paths of one or more MDUs in the system. The drive management module 102 may store the sets of execution steps (e.g., indicating the planned execution path) corresponding to each of the MDUs within a schedule maintained by the drive management module 102. The schedule may indicate an order and/or timing for executing each set of execution steps/operations.

The MDUs 106 may be configured to receive task assignments (e.g., from the task assignment module 104 directed, or indirectly via, for example, the drive management module 102). The MDUs 106 may transmit instruction requests (e.g., to the drive management module 102) and receive instruction responses (e.g., from the drive management module 102). An instruction request may include location information associated with a particular MDU such as a location identifier indicating a current location of the MDU. An instruction response may include information that instructs the MDU to perform particular operations (e.g., begin traveling along a particular heading at a particular speed). The drive management module 102 may be configured to manage space reservation to the MDUs 106 within the workspace 108. In some embodiments, the drive management module 102 may reserve space (e.g., a volume, an area, a location, etc.) within the workspace 108 for a particular MDU to execute some suitable portion of its assigned task.

The MDUs 106 may be configured to provide current location, current state, and/or other characteristics of the MDUs 106 to the drive management module 102 to provide updated awareness of the tasks and location of the MDUs 106. In some embodiments, an MDU may provide this information periodically and/or incrementally to notify the drive management module 102 of its location and/or a completion or delay associated with a portion of its assigned task.

In some embodiments, the drive management module 102 may be configured to incrementally instruct the MDUs 106 to perform each of the set of execution steps/operations in accordance with the schedule maintained by the drive management module 102. Specific components of the drive management module 102 may be discussed further below with respect to FIG. 3.

To mitigate contentions between the MDUs 106, the drive management module 102 may be configured to analyze a portion of the schedule (e.g., respective subsets of execution steps/operations associated with the MDUs 106) to determine potential contentions within a given time period. By way of example only, the drive management module 102 may compare two or more MDU's execution steps for a 30 second time period (or a time period of any suitable time duration) in order to determine potential contentions between the MDUs. For example, for a given 30 second time period, drive management module 102 may determine from the schedule that MDU 106-1 is to travel from location 112 to location 114 along path 116 and MDU 106-2 is to travel from location 118 to location 120 along path 122. By comparing the execution steps identified within the schedule and corresponding to the path 116 and the path 122, the drive management module 102 may identify a potential contention 124 corresponding to location 126. The potential contention 124 may be determined based on identifying that the MDU 106-1 and the MDU 106-2 may attempt to utilize the location 126 within substantially the same time period. In response to identifying potential contention 124, the drive management module 102 may modify the schedule to include a dependency associated with the MDU 106-1 and/or the MDU 106-2 that indicates that the potential contention 124 is to be analyzed and resolved before either MDU is to be allowed to utilize the space at location 126.

At a subsequent time, the MDU 106-1 may arrive at location 128 before MDU 106-2 arrives at location 130. At location 128, the MDU 106-1 may request additional instructions. In response, the drive management module 102 may determine that the next execution step relates to traveling to location 126, for example, and is associated with a dependency on potential contention 124. In some embodiments, the drive management module 102 may determine (based on any suitable type and number of factors) that the MDU 106-1 is to utilize the space at location 126 first, and that the MDU 106-2 is to be restricted from utilizing the space at location 126 until MDU 106-1 is no longer utilizing the space. Accordingly, the drive management module 102 may modify the schedule to such that the MDU 106-2 is restricted from utilizing the space associated with location 126 until MDU 106-1 has completed the execution step associated with the location 126 or otherwise has ceased utilizing that space. As a non-limiting example, the previous dependency that identified the potential contention may be removed from the schedule and a new dependency may be added that indicates that MDU 106-2 is to be restricted from using the space associated with location 126 until MDU 106-1 is no longer utilized that space (e.g., an execution step associated with the MDU 106-1 and the location 126 has been completed). Thus, once the schedule has been modified, the drive management module 102 may proceed to instruct MDU 106-1 to continue along path 116 into location 126 according to the modified schedule. As MDU 106-2 approaches location 126, the drive management module 102 may cause MDU 106-2 to wait at location 130 based at least in part on the modified schedule. When drive management module 102 ascertains that MDU 106-1 is no longer utilizing the space associated at location 126, the drive management module 102 may proceed to instruct MDU 106-2 to travel into the space.

In this manner, the drive management module 102 may coordinate the motion of the MDUs 106 in order to mitigate and/or entirely avoid contentions between the MDUs 106. Said another way, the drive management module 102 may cause the MDUs 106 to execute their respective tasks in a particular order and/or with particular timing such that the contention may be resolved.

Figure 2:
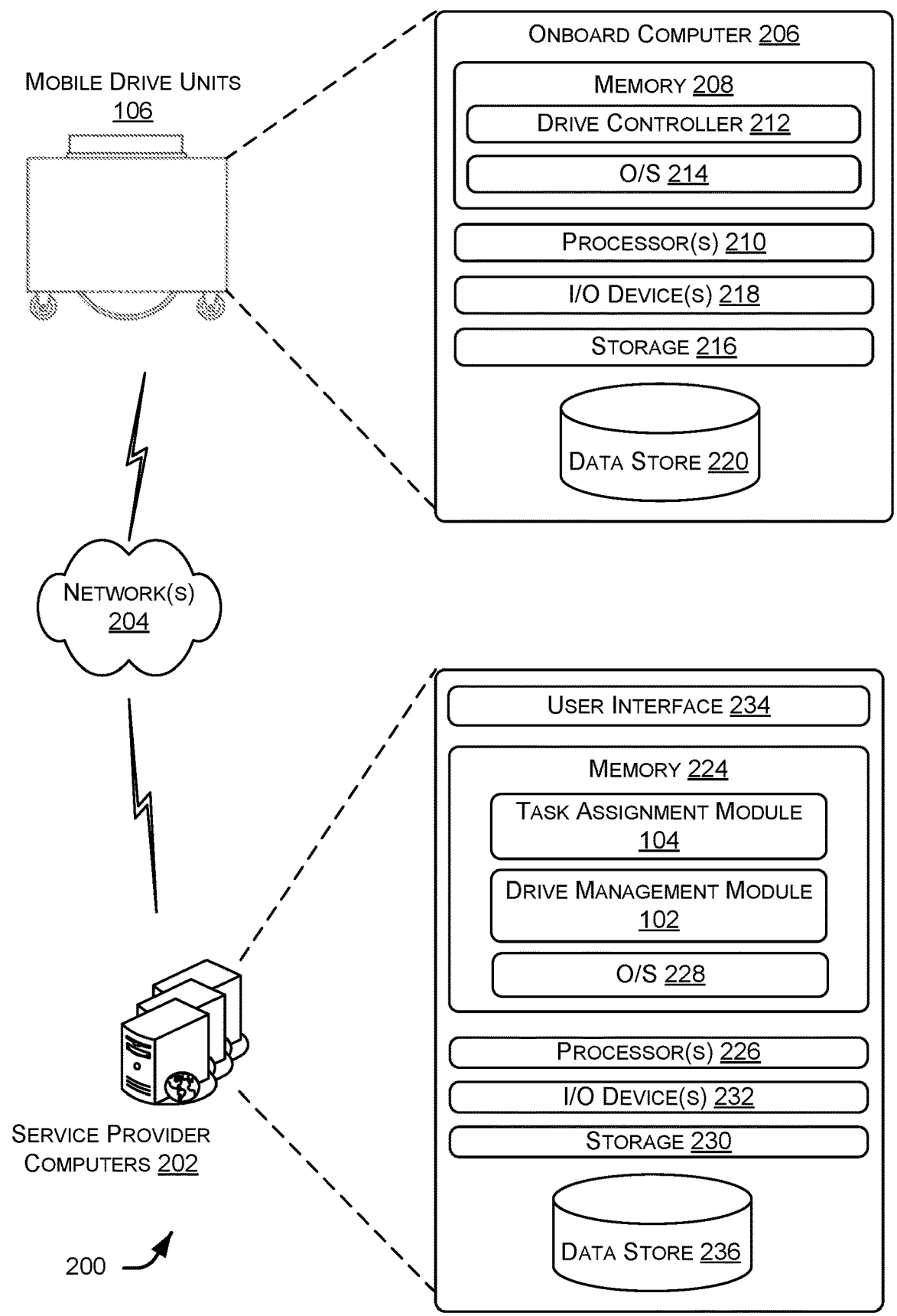
FIG. 2 is an example system architecture for implementing aspects of contention management, in accordance with at least one embodiment.

FIG. 2 is an example system architecture for a contention management system 200, in accordance with at least one embodiment. The contention management system 200 may include service provider computers 202. The service provider computers 202 may support an electronic marketplace (not shown) and interface with purchase and delivery services of the electronic marketplace. In this manner, the service provider computers 202 may coordinate receiving, storing, sorting, packaging, and/or shipping of items in a warehouse (e.g., an example of workspace 108 of FIG. 1) operated by, or on behalf of, the electronic marketplace provider. In some examples, the service provider computers 202 may be a stand-alone service operated on its own or in connection with an electronic marketplace. In either example, the service provider computers 202 may be in communication with the MDUs 106 of FIG. 1 via one or more network(s) 204 (hereinafter, "the network 204"). The network 204 may include any one or a combination of many different types of networks, such as cable networks, the Internet, wireless networks, cellular networks, radio networks, and other private and/or public networks.

Turning now to the details of the mobile drive units 106, the mobile drive units 106 may include an onboard computer 206 including at least one memory 208 and one or more processing units (or processor(s) 210). The processor(s) 210 may be implemented as appropriate in hardware, computer-executable instructions, software, firmware, or combinations thereof. Computer-executable instruction, software or firmware implementations of the processor(s) 210 may include computer-executable or machine-executable instructions written in any suitable programming language to perform the various functions described. The memory 208 may include more than one memory and may be distributed throughout the onboard computer 206. The memory 208 may store program instructions (e.g. for the drive controller 212) that are loadable and executable on the processor(s) 210, as well as data generated during the execution of these programs. Depending on the configuration and type of memory including the drive controller 212, the memory 208 may be volatile (such as random access memory (RAM)) and/or non-volatile (such as read-only memory (ROM), flash memory, or other memory). The memory 208 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 208 may include multiple different types of memory, such as static random access memory (SRAM), dynamic random access memory (DRAM), or ROM. Turning to the contents of the memory 208 in more detail, the memory 208 may include an operating system 214 and one or more application programs, modules or services for implementing the features disclosed herein including at least the drive controller 212.

In some examples, the onboard computer 206 may also include additional storage 216, which may include removable storage and/or non-removable storage. The additional storage 216 may include, but is not limited to, magnetic storage, optical disks, and/or tape storage. The disk drives and their associated computer-readable media may provide non-volatile storage of computer-readable instructions, data structures, program modules, and other data for the computing devices.

The memory 208 and the additional storage 216, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 206. The modules of the onboard computer 206 may include one or more components. The onboard computer 206 may also include input/output (I/O) device(s) 218 and/or ports, such as for enabling connection with a keyboard, a mouse, a pen, a voice input device, a touch input device, a display, speakers, a printer, or other I/O device. The I/O device(s) 218 may enable communication with the other systems of the mobile drive units 106. In at least some embodiments, the I/O device(s) 218 may include one or more sensors including any suitable combination of one or more imaging devices (e.g., a camera), one or more accelerometers, one or more gyroscopes, one or more scanning devices, or any suitable sensor configured to collect sensor data.

The onboard computer 206 may also include data store 220. The data store 220 may include one or more databases, data structures, or the like for storing and/or retaining information associated with the mobile drive units 106 (e.g., planned paths, execution step instructions, etc.).

The service provider computers 202, perhaps arranged in a cluster of servers or as a server farm, may be configured to manage the mobile drive units 106 as part of an inventory and/or sortation system. For example, the service provider computer 202 may be configured to manage the mobile drive units 106 within the workspace 108 of FIG. 1 (e.g., a warehouse for storing and/or sorting inventory items). The service provider computers 202 may include at least one memory 224 and one or more processing units (or processor(s)) 226. The processor(s) 226 may be implemented as appropriate in hardware, computer-executable instructions, software, firmware, or combinations thereof. Computer-executable instruction, software or firmware implementations of the processor(s) 226 may include computer-executable or machine-executable instructions written in any suitable programming language to perform the various functions described.

The memory 224 may include more than one memory and may be distributed throughout the service provider computers 202. The memory 224 may store program instructions (e.g., related to the drive management module 102 and/or the task assignment module 104 of FIG. 1) that are loadable and executable on the processor(s) 226, as well as data generated during the execution of these programs. Depending on the configuration and type of memory including the drive management module 102 and/or the task assignment module 104, the memory 224 may be volatile (such as random access memory (RAM)) and/or non-volatile (such as read-only memory (ROM), flash memory, or other memory). The service provider computers 202 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 224 may include multiple different types of memory, such as static random access memory (SRAM), dynamic random access memory (DRAM), or ROM.

Turning to the contents of the memory 224 in more detail, the memory 224 may include an operating system 228 and one or more application programs, modules or services for implementing the features disclosed herein including the drive management module 102 and/or the task assignment module 104. In FIG. 2, the memory 224 is depicted as including both the task assignment module 104 and the drive management module 102. It should be appreciated that while in some embodiments these modules may be provided by the service provider computers 202, in other embodiments aspects of the task assignment module 104 may be performed by another computing device separate from the service provider computer 202 that is communicatively coupled to the service provider computer 202.

As discussed above in connection with FIG. 1, the task assignment module 104 may be configured to assign tasks to one or more of the MDUs 106. In some examples, the task assignment module 104 may select a particular MDU of the MDUs 106 based on a current location of the particular MDU, one or more locations associated with the task, various capabilities and/or attributes of the MDU (e.g., a speed capability, a maximum load capacity, etc.), other tasks assigned to one or more MDUs, or any suitable combination of the above. Additionally, the task assignment module 104 may be configured to generate a task schedule that indicates the assigned task and/or a number of sub-tasks of the assigned tasks. The task assignment module 104 may be configured to transmit the task schedule to the drive management module 102.

Aspects of the drive management module 102 may be discussed further below in connection with FIG. 3.

In some examples, the service provider computers 202 may also include additional storage 230, which may include removable storage and/or non-removable storage. The additional storage 230 may include, but is not limited to, magnetic storage, optical disks, and/or tape storage. The disk drives and their associated computer-readable media may provide non-volatile storage of computer-readable instructions, data structures, program modules, and other data for the computing devices.

The memory 224 and the additional storage 230, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computers 202. The modules of the service provider computers 202 may include one or more components. The service provider computers 202 may also include input/output (I/O) device(s) 232 and/or ports, such as for enabling connection with a keyboard, a mouse, a pen, a voice input device, a touch input device, a display, speakers, a printer, or other I/O device.

In some examples, the service provider computers 202 may include a user interface 234. The user interface 234 may be utilized by an operator, or other authorized user to access portions of the service provider computers 202. In some examples, the user interface 234 may include a graphical user interface, web-based applications, programmatic interfaces such as application programming interfaces (APIs), or other user interface configurations. The service provider computers 202 may also include data store 236. The data store 236 may include one or more databases, data structures, or the like for storing and/or retaining information associated with the service provider computers 202. In some examples, the service provider computers 202 may store the task schedule generated by the task assignment module 104 and/or various information generated and/or maintained by the drive management module 102.

Figure 3:
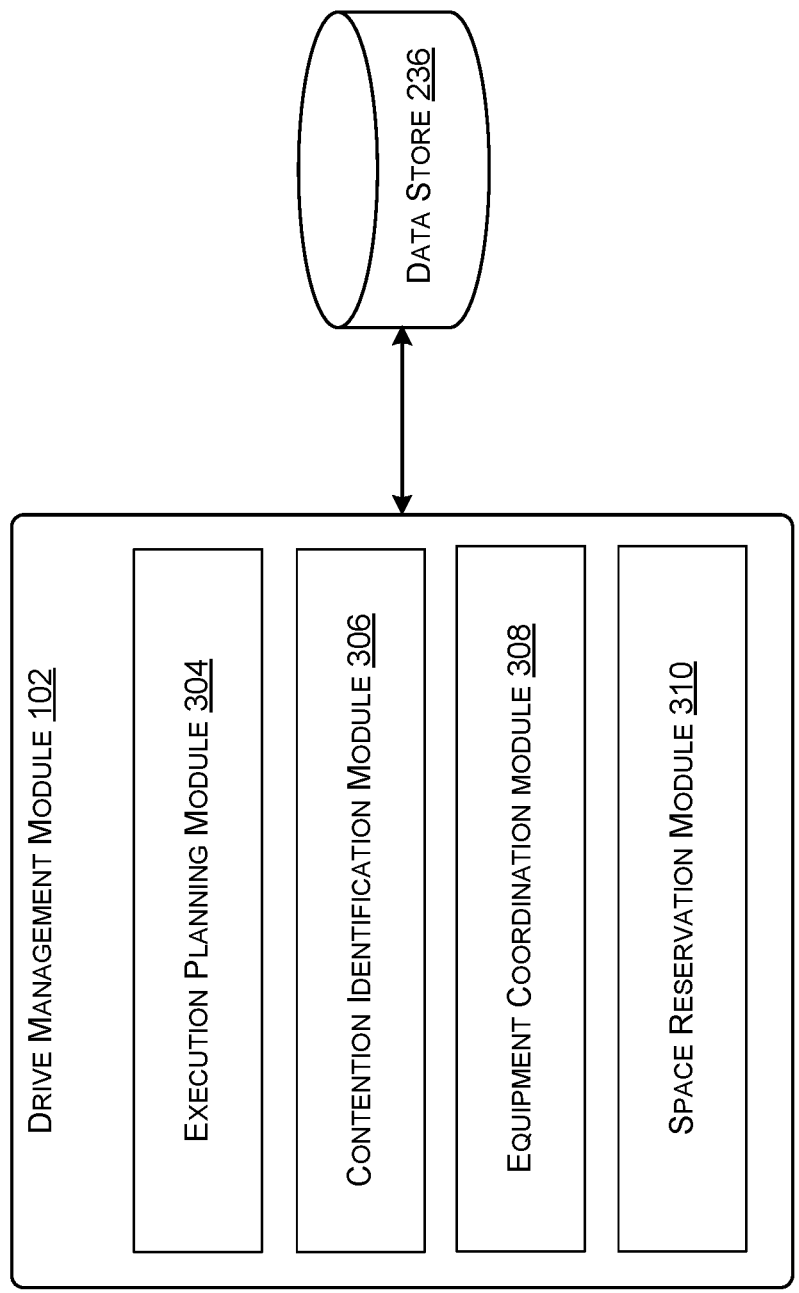
FIG. 3 illustrates in greater detail the components of an example drive management module that may be utilized to resolve contentions among MDUs, in accordance with at least one embodiment.

FIG. 3 illustrates in greater detail an example drive management module 102 that may be utilized to resolve contentions among MDUs (e.g., the MDUs 106 of FIGS. 1 and 2), in accordance with at least one embodiment. As shown, the example embodiment includes modules 302 including an execution planning module 304, a contention identification module 306, an equipment coordination module 308, and a space reservation module 310. It should be appreciated that each module of FIG. 3 may be executed on a single computer, and or each component, or sets of components may be executed on separate computers. The modules 302 may be communicatively coupled to the data store 236 of FIG. 2 such that data may be exchanged between the modules 302 and the data store 236.

In at least one embodiment, the execution planning module 304 may be configured to obtain and/or receive a task schedule. The task schedule may be generated by a component and/or device external to the drive management module 102 (e.g., the task assignment module 104 of FIG. 3). In some embodiments, the execution planning module 304 may be configured to receive the task schedule from the task assignment module 104, or via another component and/or device such as the data store 236. For example, the task schedule generated by the task assignment module 104 may be stored in and retrieved from the data store 236, a data store that is communicatively coupled with the drive management module 102 and configured to store such information. As discussed above, the task schedule may correspond to various plannable activities (e.g., fetch an item, carry an item, store an item, etc.) to be performed by the MDUs of a workspace (e.g., the workspace 108 of FIG. 1).

In some embodiments, the execution planning module 304 may obtain a current location of a MDU and a destination location associated with a task assigned to the MDU. The execution planning module 304 may generate a schedule identifying a set of execution steps for the MDU. When corresponding instructions are executed by the MDU, the MDU may execute its assigned task. The execution planning module 304 may utilize the task schedule generated by the task assignment module 104 to identify the set of execution steps. The set of execution steps may include any suitable number and/or combinations of a navigational operations of the MDU (e.g., operations related to causing the MDU to travel along a planned path), sensor-based operations (e.g., operations utilizing one or more onboard sensors of the MDU such as a camera, accelerometer, gyroscope, inertial sensor, etc.), or mechanical-based operations (e.g., operations related to an onboard conveyor belt, robotic arm, etc.).

The execution planning module 304 may implement any appropriate algorithms utilizing any appropriate parameters, factors, and/or considerations to determine the appropriate set of execution steps (e.g., including a planned path) for each MDU that has been assigned a task within the task schedule. The execution planning module 304 may utilize the identified set(s) of execution steps and modify the task schedule and/or generate a more detailed schedule that identifies the respective set of execution steps (e.g., indicating, for example, a planned execution path) associated with each MDU that has been assigned a task. The execution planning module 304 may be configured to transmit the generated schedule to the contention identification module 306 and/or store the generated schedule within the data store 236, a data store configured to store such data.

In at least one embodiment, the contention identification module 306 may be configured to obtain a schedule indicating sets of execution steps. Each of the sets of execution steps may be associated with a given task assigned to one or more MDUs within a workspace. In some embodiments, the contention identification module 306 may utilize a previously-stored schematic of the workspace and overlay planned paths of the MDUs (determined from the schedule/execution steps) to determine space(s) at which the planned paths overlap. If an overlap is identified, the contention identification module 306 may be configured to modify the schedule (e.g., the schedule stored in data store 236) to include an indication of the contention. In some embodiments, the contention identification module 306 may compare individual execution steps of at least two different MDUs to determine if there is a match (e.g., the execution steps are scheduled to be performed at a same space, at approximately a same time). If the contention identification module 306 identifies a match, the contention identification module 306 may be configured to modify the schedule to indicate the contention. The indication of contention may be in various forms such as an indicator and/or field associated with a particular execution step, a dependency associated with two or more execution steps, an association between a contention and one or more MDUs, or the like. By way of example, a dependency may be added to the schedule that identifies that before any of the affected MDUs are to perform their respective execution steps involved in the contention (or at least a potential contention), the contention is to be resolved.

In at least one embodiment, the contention identification module 306 may be configured to identify all the contentions over a time period associated within some portion of the schedule. In some embodiments, all of the contentions may be identified and schedule may be modified to indicate each and every contention present. In some embodiments however, to reduce processing needs, a smaller portion of the schedule may be analyzed for potential contentions. For example, the contention identification module 306 may be configured to determine a default value corresponding to a time period duration (e.g., 30 seconds, 1 minute, 1 hour, 12 seconds, etc.) within which potential contentions may be identified. For example, a default value may be obtained, or a user may provide (e.g., via user interface 234 of FIG. 2) a time period duration. By way of example, a time period duration of 30 seconds may be identified by the contention identification module 306. Accordingly, the contention identification module 306 may analyze execution steps of the MDUs scheduled to occur within the first 30 second time period (or next 30 second time period with respect to a previously analyzed time period). By analyzing this data incrementally, the contention identification module 306 may realize lower processing costs than if it were to analyze the entire schedule at once. Additionally, it is contemplated that as tasks are executed, one or more drives may be delayed and the schedule may be updated to account for these changes. Analyzing the entire schedule at once rather than in incremental time periods may cause needless processing of potential contentions that, due to delays or changes in the schedule, may be less likely to occur.

It should be appreciated that although a single contention identification module is depicted in FIG. 3, the drive management module 102 may include more than one contention identification module. For example, any suitable number of contention identification modules similar to the contention identification module 306 may be utilized. In some embodiments, each contention identification module 306 may be configured to identify contentions within a particular area/region of a workspace in order to distribute the processing requirements of contention identification among a number of modules. By way of example, a first contention identification module may be configured to identify contentions within a first area (e.g., half, a quarter, a particular area, etc.) within a workspace (e.g., the workspace 108) while a second contention identification module may be configured it identify contentions within a second area that is different from the first area. Thus, the two contention identification modules may share the processing burden of identifying contentions among the MDUs 106.

In at least one embodiment, the contention identification module 306 may be configured to receive indication that a user has entered an area of the workspace. This indication may be received from a user device via any suitable communication means and/or the indication may be received from the space reservation module 310 discussed in further detail below. The contention identification module 306 may treat the existence of the user within the workspace as a contention itself. For example, the contention identification module 306 may determine the area/space currently being utilized by the user and may modify the schedule to include any suitable number of additional dependencies. These additional dependencies may cause any suitable number of MDUs to be restricted from using the contended space currently occupied by the user/user device. By way of example, MDUs having execution steps that may cause the MDU to travel within the contended space occupied by a user may be identified by the contention identification module 306. Once these execution steps are identified, dependencies may be added to the schedule such that each MDU may be restricted from performing the identified execution steps until the user/user device has left the contended space.

In at least one embodiment, the equipment coordination module 308 may be configured to manage task execution by one or more MDUs. In some embodiments, the equipment coordination module 308 may be communicatively coupled (e.g., via the network(s) 204 of FIG. 2) to one or more MDUs within a workspace (e.g., the workspace 108 of FIG. 1). The equipment coordination module 308 may receive, obtain, or access the schedule generated by the execution planning module 304. By way of example, the equipment coordination module 308 may obtain the schedule generated by the execution planning module 304 and/or from the data store 236. The equipment coordination module 308 may be configured to identify a set of execution steps associated with an MDU. The schedule may be utilized by the equipment coordination module 308 to track the MDUs progress through the various execution steps in the associated set. In some examples, the equipment coordination module 308 may maintain progress data that may identify which execution steps have already been performed, a next execution step to be performed, and/or any suitable data that may be used to track the progress of the MDU as it performs the execution steps.

In at least one embodiment, the equipment coordination module 308 may be configured to transmit a space reservation request to the space reservation module 310 in order to reserve space within the workspace (e.g., the workspace 108) needed for a particular MDU to perform an execution step. The equipment coordination module 308 may be configured to receive space reservation response indicating whether the reservation request was granted or denied. If the space reservation request is denied, the equipment coordination module 308 may be configured to resubmit a space reservation request at any suitable time, at a periodic rate, or the like until a space reservation response is received indicating that the request has been granted and, thus, the space has been reserved for the MDU.

In some examples (e.g., when the space reservation request is denied) the equipment coordination module 308 may be configured to trigger a process for determining alternative execution steps (e.g., pertaining to an alternative planned route) for the MDU. By way of example, the equipment coordination module 308 may transmit data to the execution planning module 304 to cause the execution planning module 304 to determine an alternative route/execution steps for the MDU to perform its task. In some examples, the equipment coordination module 308 may be configured to trigger a process for canceling the task assignment for the MDU. For example, the equipment coordination module 308 may be configured to send data to the task assignment module 104 of FIG. 2 that causes the task assigned to the MDU to be canceled. The task assignment module 104 may reassign a new task to the MDU and/or the task assignment module 104 may assign the canceled task to another MDU of the system.

Subsequent to receiving a space reservation response that indicates the needed space has been reserved for an MDU, the equipment coordination module 308 may be configured to transmit instructions to the MDU. The instructions may be identified based at least in part on the set of executions steps associated with the MDU and/or the task assigned to the MDU. The instructions may be received by a component of the MDU such as the drive controller 212 of FIG. 2. Upon receipt, or at another suitable time, the drive controller 212 may utilize the received instructions to cause the MDU to perform an execution step. For example, the instructions may cause the drive controller 212 to perform any suitable operations for causing the MDU to perform at least one of: travelling in a particular direction, maintaining or modifying a speed of travel, performing a rotational motion (e.g., rotate clockwise 90 degrees), halting motion of the MDU, following another object (e.g., another MDU), collecting sensor data utilizing onboard sensors of the MDU, operating another mechanical device of the MDU such as a conveyor belt or robotic arm, lifting an item, carrying an item, delivering an item, or any suitable operation capable of being performed by the MDU.

In at least one embodiment, the equipment coordination module 308 may be configured to receive location information identifying a location of an MDU and/or execution progress data indicating the execution state of the last instructions provided to the MDU. The location information and/or the execution progress data may be received directly from the MDU or from another source (e.g., a different MDU, a tracking system of the workspace 108, etc.). In some embodiments, the equipment coordination module 308 may determine from the location information and/or from the execution progress data that the MDU has completed or is about to complete an execution step. In some embodiments, the MDU may request additional instructions from the equipment coordination module 308. Upon determining that further instructions are to be provided to the MDU either from ascertaining as much from the location information and/or execution progress data, or by receiving a request for instructions from the MDU, the equipment coordination module 308 may identify a next execution step for the MDU from the schedule. Once identified, the equipment coordination module 308 may submit an additional space reservation request for the required space. If a response is received indicating that the space has been reserved (e.g., the request has been granted), the equipment coordination module 308 may be configured to provide further instructions to the MDU (e.g., via the drive controller 212) in order to cause the MDU to perform the next execution step.

It should be appreciated that although a single equipment coordination module is depicted in FIG. 3, the drive management module 102 may include more than one equipment coordination module. For example, any suitable number of equipment coordination modules may be utilized. In some embodiments, a particular equipment coordination module may be responsible for managing task execution of a particular MDU within the workspace. By way of example, in a workspace including 100 MDUs, 100 equipment coordination modules may be utilized in a 1-to-1 fashion in order to manage task execution of the 100 MDUs. In some examples, equipment coordination modules may be utilized in a 1-to-many fashion in order to manage task execution of the 100 MDUs.

During the course of incrementally instructing an MDU to perform a set of execution steps according to the schedule, the equipment coordination module 308 may be configured to identify that a contention associated with the MDU exists. For example, the equipment coordination module 308 may be configured to identify from the schedule that a particular execution step is associated with a contention previously identified by the contention identification module 306. By way of example, the equipment coordination module 308 may determine a next execution step from the schedule for an MDU. The equipment coordination module 308 may additionally identify a dependency within the schedule that is associated with next execution step. The dependency information may indicate one or more other MDUs that may be potentially affected by the contention. Additionally, or alternatively, the equipment coordination module 308 may be configured utilize the schedule to identify one or more MDUs potentially affected by the contention. The equipment coordination module 308 may be configured with logic that provides specific rules for resolving contentions between one or more MDUs. Specific examples of this logic may be discussed further below in the following figures.

Utilizing these specific rules, the equipment coordination module 308 may determine an order (or timing) by which the MDUs are allowed to utilize the contended space (or at least that a particular MDU is to be provided usage of the contended space first). The equipment coordination module 308 may execute operations to modify the schedule to enable one MDU to be unrestricted from utilizing the contended space. The schedule may further be modified to include one or more additional dependencies that indicate the other MDUs are to be restricted from utilizing the contended space until the first MDU is no longer utilizing the space. In some examples, the equipment coordination module 308 may determine an order/timing by which the affected MDUs are to be allowed access to the contended space. In some embodiments, the equipment coordination module 308 may determine the order/timing incrementally. As a non-limiting example, in a contention involving three MDUs, the equipment coordination module 308 may determine a first MDU is to utilize the contended space first (e.g., based at least in part on the specific contention rules). When the equipment coordination module 308 ascertains that the first MDU has completed the execution step and/or is no longer utilizing the contended space, the equipment coordination module 308 may determine a second MDU of the remaining two MDUs for which the contended space is to be reserved (e.g., based at least in part on the specific contention rules). When the equipment coordination module 308 ascertains that the second MDU has completed the execution step and/or is no longer utilizing the contended space, the equipment coordination module 308 may cause the contended space to be reserved for the third MDU such that the third MDU may utilize the space to perform an execution step.

In some embodiments, the equipment coordination module 308 may be configured to determine that a space may be shared by multiple MDUs in a coordinated manner. For example, the equipment coordination module 308 may determine that two MDUs could travel in a same direction through a contended space (e.g., one MDU may follow another MDU). Thus, the equipment coordination module 308 may submit space reservation requests for the first MDU and the second MDU in a coordinated manner such that the space may be reserved for the respective MDUs (e.g., by the space reservation module 310). By way of example, the equipment coordination module 308 may submit a space reservation request for the first MDU to the space reservation module 310 discussed below. The space reservation request may be granted and the equipment coordination module 308 may instruct the first MDU to proceed with executing the appropriate operations. As the first MDU proceeds with execution, the equipment coordination module 308 may submit another space reservation request for the second MDU that indicates that the second MDU is execute its next operation while following the first MDU (e.g., maintain a threshold distance from the first MDU). If the space reservation request is granted, the equipment coordination module 308 may instruct the second MDU to perform the execution step while also maintaining some distance (e.g., 1 foot, 1 meter, etc.) from the first MDU.

The space reservation module 310 may be configured to receive space reservation requests from the MDUs 106 and/or the equipment coordination module 308. These space reservation requests may indicate a request for the use of a particular portion of the workspace (e.g., the workspace 108 of FIG. 1) within which the MDU associated with the space reservation request resides. In response to received space reservation requests, the space reservation module 310 may transmit a space reservation response granting or denying the space reservation request to one or more equipment coordination modules (e.g., the equipment coordination module 308). In at least one embodiment, the decision to grant or deny a space reservation request may depend on any suitable factor(s) including, but not limited to, other space reservation requests pertaining to other MDUs and scheduling rules associated with the workspace 108. If a space reservation request is granted, the requested space (e.g., a volume, a 3-dimensional area, etc.) corresponding to the space reservation request may be reserved for the particular MDU associated with that space reservation request. While reserved, a space may be utilized by a single MDU for which the reservation pertains, and no others.

It should be appreciated that in some embodiments a space may be shared by multiple MDUs in a coordinated manner. For example, one or more MDUs may utilize the space to follow another MDU. Thus, a space may be reserved for both a first MDU and a second MDU, but the following MDU (e.g., the second MDU) may be instructed to maintain some distance (e.g., 1 foot, 1 meter, etc.) from the leading MDU (e.g., the first MDU). It should be appreciated that the space reservation module 310 may be configured to determine when space may be reserved for more than one MDU at a time (e.g., in follow-the-leader type situations).

In some embodiments, the space reservation module 310 may be configured to receive a space reservation request from a user device (e.g., a cell phone, a scanner, etc.) that request use of a particular space within the workspace for a human being. The space reservation module 310 may treat the space reservation request in a manner consistent with space reservation requests received from MDUs. In some embodiments, a space reservation request from a user device may be granted immediately and prioritized over potentially every other space reservation in the system. The space reservation module 310 may communicate the space reservation to the contention identification module 306. The space reservation module 310, the contention identification module 306, or any suitable component of the drive management module 102 may cause the scheduled to be updated according to the space reservation. For example, the contention identification module 306 may identify from the schedule any MDU and/or execution that is associated with the contended space currently occupied by a human being. Accordingly, the contention identification module 306 may be configured to insert any suitable number of dependencies into the schedule such that the MDUs may not perform the identified execution steps until it is determined that the human being no longer occupies the contended space. When the human being (e.g., the user device) is determined no longer occupy the space, the contention identification module 306 may be configured to remove the dependencies such that MDU activities within the now available space may resume.

Figure 4:
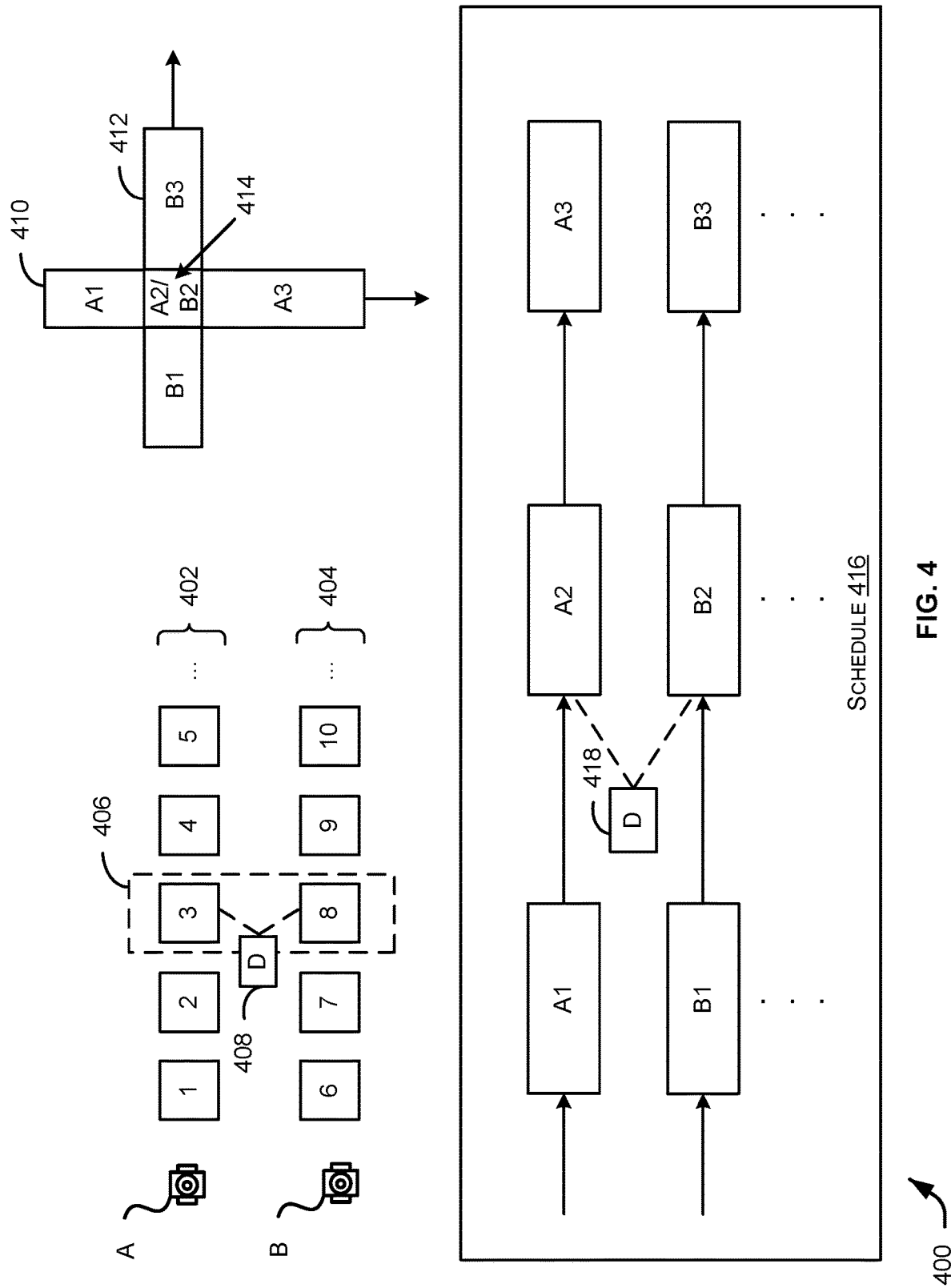
FIG. 4 is a schematic diagram illustrating an example techniques for identifying a contention between two MDUs utilizing the drive management module of FIG. 3, in accordance with at least one embodiment.

FIG. 4 is a schematic diagram 400 illustrating example techniques for identifying a contention between two MDUs (e.g., MDU A and MDU B) utilizing the drive management module 102 of FIGS. 1-3, in accordance with at least one embodiment. MDU A and MDU B may be examples of MDUs 106 of FIG. 1. MDU A may be assigned (e.g., by the task assignment module 104 of FIG. 1) a task. MDU As task may include a set of execution steps 402. For illustrative purposes only, performance of the set of execution steps 402 by the MDU A may cause MDU A to travel within a workspace from location 1 to location 2, from location 2 to location 3, from location 3 to location 4, from location 4 to location 5, and from location 5 to a destination. The set of execution steps 402 for MDU A may be defined by a schedule generated by the execution planning module 304 of FIG. 3.

MDU B may similarly be assigned a task that may include a set of execution steps 404. For illustrative purposes only, performance of the set of execution steps 404 by the MDU B may cause MDU B to travel within a workspace from location 6 to location 7, from location 7 to location 8, from location 8 to location 9, from location 9 to location 10, and from location 10 to a destination. The set of execution steps 404 for MDU B may be defined by the schedule generated by the execution planning module 304 of FIG. 3. The examples depicted in FIG. 4 are intended to be illustrative in nature. More or fewer instructions may be included in the MDU's respective sets of execution steps. A single execution step may include a single instruction or many instructions. The execution step may be related to a single motion/ act of the MDU or more than one motion/act. By way of example, the execution steps 1-5 may alternatively be expressed as a single execution step (or at least fewer than 5 execution steps) that corresponds to one or more instructions that cause the MDU to travel from location 1 to the intended destination location.

In at least one embodiment, the contention identification module 306 may perform a comparison of the set of execution steps 402 associated with MDU A and the set of execution steps 404 associated with MDU B. Through this comparison, the contention identification module 306 may determine a space (e.g., a location, volume, area, 3-dimensional space) to which an execution step relates. In some embodiments, the contention identification module 306 may determine a time at which each of the execution steps may be performed. By comparing the sets of execution steps with respect to the space needed and/or the time to be performed, the contention identification module 306 may identify contention 406. That is, execution step 3 of the set of execution steps 402 may be determined by the contention identification module 306 to be likely to occur at substantially the same time and/or space as the execution step 8 of the set of execution steps 404. Once the contention 406 is identified, the contention identification module 306 may modify the schedule to include an indication of the contention (e.g., dependency 408). Dependency 408 is an example of one way in which the schedule may be modified to indicate a contention between execution step 3 and execution step 8, or more generally, a contention between MDU A and MDU B. Dependency 408 may be in any suitable form within the modified schedule. The dependency 408 may be any suitable data that indicates that performance the execution steps 3 and 8 are dependent on resolving the contention 406. That is, execution steps 3 and 8 are not to be performed until the contention 406 is resolved.

In some embodiments, the contention identification module 306 may utilize a map or other suitable schematic of the workspace in which MDU A and MDU B are located (e.g., workspace 108 of FIG. 1). The contention identification module 306 may overlay the path 410 corresponding to MDU A and the path 412 corresponding to MDU B such that an intersection 414 may be identified. The path 410 may be the path MDU A is expected to travel as the set of execution steps 402 are performed. Similarly, the path 412 may be the path MDU B is expected to travel as the set of execution steps 404 are performed.

In some embodiments, the path 410 may correspond to a single execution step, and the path 412 may also correspond to a single execution step. If an intersection 414 is identified by overlapping path 410 and path 412, the contention identification module 306 may divide an execution step into multiple segments. For example, given a single execution step corresponding to path 410 and the intersection 414, the contention identification module 306 may modify the schedule to divide the execution step of MDU A into segment A1 (corresponding to motion/acts prior to the contention), segment A2 (corresponding to motions/acts involved in the contention indicated by the intersection 414), and segment A3 (corresponding to motion/acts subsequent to the contention). The contention identification module 306 may modify the schedule to replace the single execution step of MDU A with three execution steps corresponding to segments A1, A2, and A3 as shown in schedule 416. In a similar manner, the contention identification module 306 may modify the schedule to divide an execution step of MDU B corresponding to path 412 into segment B1 (corresponding to motion/ acts prior to the contention), segment B2 (corresponding to motion/acts involved in the contention indicated by the intersection 414), and segment B3 (corresponding to motion/acts subsequent to the contention). The contention identification module 306 may then replace the single execution step in the schedule with execution steps corresponding to segments B1, B2, and B3 as depicted in schedule 416.

Once the schedule 416 has been modified to include the execution steps corresponding to each segment, the contention identification module 306 may indicate a contention associated with the segments A2 and B2 (corresponding to intersection 414) with dependency 418. Dependency 418 may be in any suitable form within the schedule 416. The dependency 418 may be any suitable data that indicates that performance the execution steps associated with segment A2 and segment B2 are dependent on resolving a contention indicated by the dependency. That is, these execution steps are not to be performed until the contention indicated by the dependency 418 is resolved.

Figure 5:
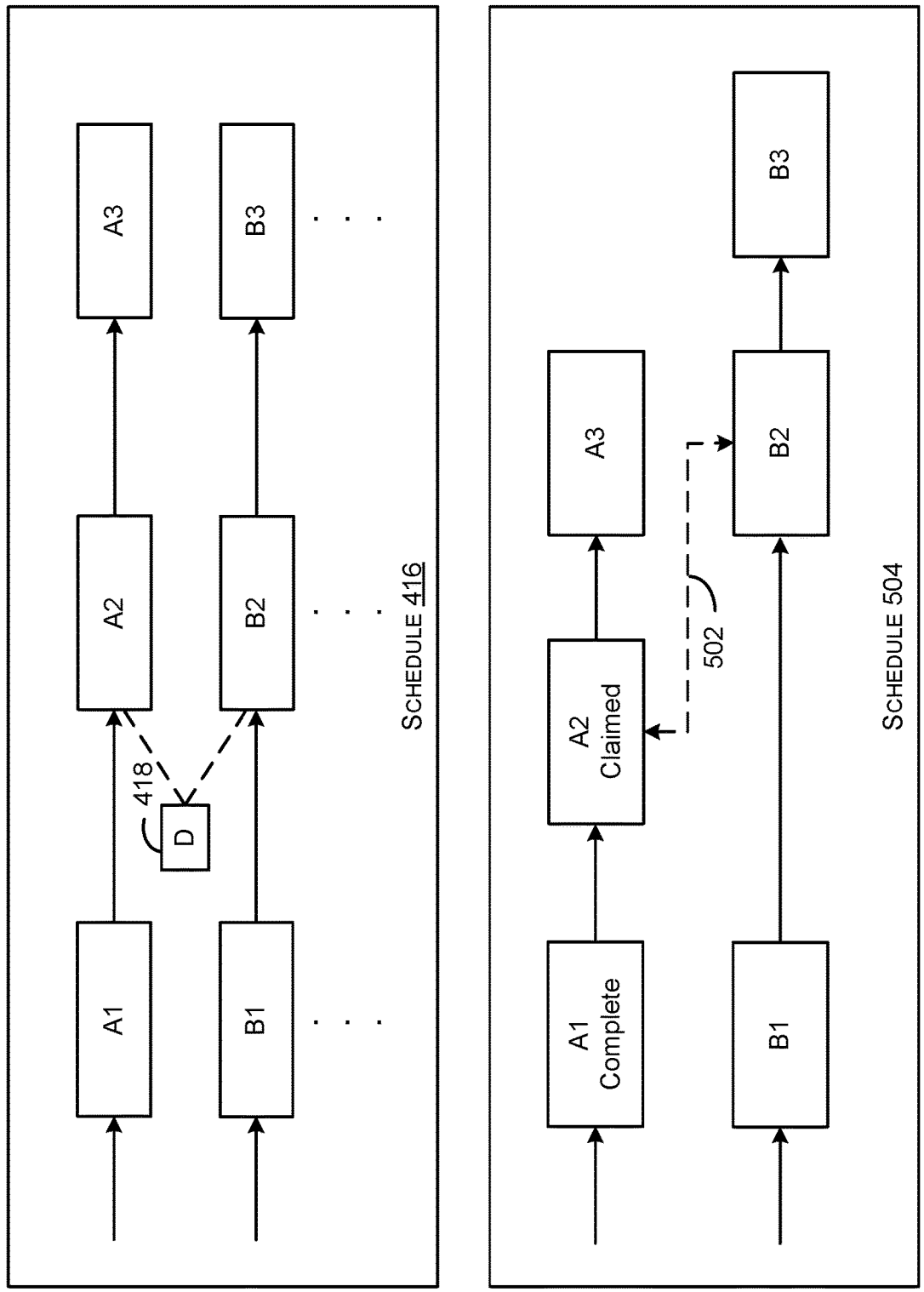
FIG. 5 is a schematic diagram illustrating a modified schedule of execution steps related to the contention discussed in FIG. 4, in accordance with at least one embodiment.

FIG. 5 is a schematic diagram illustrating an example of contention resolution, in accordance with at least one embodiment. Continuing with the example contention of FIG. 4, as MDU A and MDU B of FIG. 4 proceed to perform the execution steps identified in schedule 416. One or both of the MDUs may arrive at (or approach) the area associated with the contention. By way of example, A1 may perform operations associated with the execution step A1. At substantially the same time MDU performs operations associated with the execution step B2. For purposes of illustration, MDU A may arrive at a location and/or request further instructions. The equipment coordination module 308 of FIG. 3 may determine that, according to the schedule 416 the next execution step associated with MDU A is execution step A2. The equipment coordination module 308 may determine that the execution step A2 is associated with the dependency 418.

Upon determining that MDU A is associated with the dependency 418, the equipment coordination module 308 may execute logic corresponding to contention resolution rules in order to identify a resolution. By way of example, the equipment coordination module 308 may identify from the schedule 416 and/or from the dependency 418, that MDU A and MDU B are involved in the contention. The equipment coordination module 308 may determine from the schedule (or from another equipment coordination module configured to manage task execution of MDU B) that MDU B has not reached execution step B2. In some embodiments, the contention resolution rules executed by the equipment coordination module 308 may dictate that because MDU A was the first MDU to reach the contention, MDU A should be allowed to use the contended space first. Accordingly, the schedule 416 may be modified by the equipment coordination module 308 such that the dependency 418 of schedule 416 is removed and a new dependency 502 is added to indicate that the execution step B2 is restricted from being performed until the execution of execution step A2 is completed. Schedule 504 depicts the modified schedule including dependency 502. When MDU B reaches a point in execution when execution step B2 is the next step to be executed, MDU B may not be provided instructions to perform execution step B2 until MDU A is instructed to perform execution A3, MDU A is no longer occupying the contended space (determinable using location information provided by MDU A), or upon any suitable indication that MDU A is no longer performing execution step A2 and/or occupying the contended space.

Allowing MDUs to claim the contended space in a first come first serve basis as described above is merely one example of contention resolution. The contention resolution rules may be more extensive and wide ranging. For example, tasks assigned to MDUs may be associated with a priority. Contention resolution may be based at least in part on enabling an MDU with a higher priority task to utilize the contended space before an MDU with a lesser priority task. The MDUs involved in the contention may be traveling at different speeds. Thus, contention resolution may be based at least in part on the respective speeds of the MDUs. For example, a fast moving MDU may be allowed use of the contended space over a slower moving MDU. Respective MDUs may be carrying cargo such as an item. The item may have particular attributes. Thus, contention resolution may be based at least in part on the item attributes of the respective MDUs' cargo. For example, an MDU carrying a fragile item may be provided use of the contended space over an MDU carrying an item that is not as fragile.

It should be appreciated that contention resolution rules may be numerous and may vary. Example contention resolution rules discussed herein are not intended to be an exhausted list of the possible contention resolution rules. Generally speaking, the contention resolution rules may be any suitable rule related to determining an order/timing by which two or more MDUs should be allowed to utilize a space. These contention rules may be based on any suitable combination of the capabilities of one or more MDUs involved in the contention (e.g., a braking capability/how quickly the MDU can slow down, battery power levels, etc.), current kinematic data (e.g., heading, speed, etc.), item attributes (e.g., weight, dimensions, material, fragility, expiration date, temperature, item name, item identifier, etc.), task priority (e.g., high, medium, low, etc.), or the like.

FIG. 6 includes schematic diagrams 600 illustrating example techniques for identifying one or more contentions between three MDUs (e.g., MDU A, MDU B, and MDU C) utilizing the drive management module 102 of FIGS. 1-3, in accordance with at least one embodiment. MDU A, MDU B, and MDU C may be examples of MDUs 106 of FIG. 1. MDU A, MDU B, and MDU C may each be assigned a task by the task assignment module 104 of FIG. 1. MDU A's task may include a set of execution steps 602. For illustrative purposes only, performance of the set of execution steps 602 by the MDU A may cause MDU A to travel within a workspace along the path 604. The task assigned to MDU B may include a set of execution steps 606 that, when performed, cause MDU B to travel within the workspace along the path 608. The task assigned to MDU C may include a set of execution steps 610 that, when performed, cause MDU C to travel within the workspace along the path 612. The set of execution steps 602, 606, and 610 may each be defined by a schedule generated by the execution planning module 304 of FIG. 3.

Each set of execution steps may originally be expressed as depicted (e.g., the set of execution steps 602 may be expressed in execution steps A1-A5), or the set of execution steps may include fewer execution steps that are then segmented into the execution steps depicted. By way of example, the schedule may define the set of execution steps associated with MDU A's scheduled travel along path 604 in any suitable number of execution steps (e.g., 1, 5, etc.).

In at least one embodiment, the contention identification module 306 may perform a comparison of the sets of execution steps 602, 606, and 610. The contention identification module 306 may determine a space (e.g., a location, volume, area, 3-dimensional space) to which each execution step relates. In some embodiments, the contention identification module 306 may determine a time at which each of the execution steps of each of the sets may be performed. By comparing the execution steps of each set with respect to the space needed and/or the time to be performed, the contention identification module 306 may identify contentions 613, 614, 616, and 618, and 620. For example, execution step A2 of the set of execution steps 402 may be determined by the contention identification module 306 to be likely to occur at substantially the same time and/or space (e.g., location 10 of a workspace) as the execution step B2 of the set of execution steps 606. Once the contention 613 is identified, the contention identification module 306 may modify the schedule to include an indication (e.g., a flag, a dependency, etc.) of the contention. Contention 614 may correspond to a potential situation in which MDU A may be scheduled to perform execution step A3 at location 11 at approximately the same time MDU B may be scheduled to perform execution step B3. Contention 616 may correspond to a potential situation in which MDU A may be scheduled to perform execution step A4 at locations 12-14 at approximately the same time MDU B may be scheduled to perform execution step B4. Contention 620 relates to an additional contention related to contention 616 that indicates that MDU A or MDU B may contend with space for which MDU C is scheduled to use (e.g., locations 12-14). Contention 618 may correspond to a potential situation in which MDU B may be scheduled to perform execution step B5 at location 15, when location 15 may also be needed to enable MDU C to perform execution step C2. For each contention, one or more dependencies may be added to the schedule (e.g., by the contention identification module 306 of FIG. 3). Dependencies and/or indicators corresponding to contentions 612-620 may be in any suitable form within the schedule.

In at least one embodiment, during performance of a process for identifying potential contentions the contention identification module 306 may determine that two or more MDUs may attempt to occupy the same volume within a range of time with respect to one another. Additionally, or alternatively, the contention identification module 306 may determine that a number of execution steps of one MDU may conflict with a number of execution steps of another MDU. By way of example, Execution step C2 of MDU C may also conflict with A4/B4 execution steps of MDU A and B. Expressed another way, execution step C2 of MDU C may also conflict with execution steps B4 and B5 of MDU B. The contention identification module 306 may identify such contentions (e.g., contention 622) by comparing a range of execution steps of respective MDUs. Accordingly, the contention identification module 306 may be configured to identify that if MDU C is allowed to occupy location 15 (e.g., corresponding to execution step C2) first, then MDU A and MDU B cannot be allowed to occupy the locations 12-14 before MDU C has completed execution step C3 and vacated the locations 12-14.

In some embodiments, the contention identification module 306 may utilize a map or other suitable schematic of the workspace in which MDU A, MDU B, and MDU C are located (e.g., workspace 108 of FIG. 1). The contention identification module 306 may overlay the path 604 corresponding to MDU A, the path 608 corresponding to MDU B, and the path 612 corresponding to MDU C as depicted at 622.

In some embodiments, the paths may each correspond to a single execution step or many steps. If overlaps are identified from overlaying the paths, the contention identification module 306 may divide an execution step into multiple segments. For example, given a single execution step corresponding to the entire path 604, the contention identification module 306 may modify the schedule to divide the execution step of MDU A into segment A1-A5. The contention identification module 306 may then replace the single execution step in the schedule with execution steps corresponding to segments A1-A5 as depicted at 622. The execution step(s) of paths 608 and 612 may be similarly segmented into segments B1-B6 and C1-C4 respectively. The segments may then be included in the schedule (replacing previously defined execution steps).

Once the schedule has been modified to include the execution steps corresponding to each segment, the contention identification module 306 may insert indicators (e.g., dependencies) indicating the various contentions 612-620.

Figure 7A:
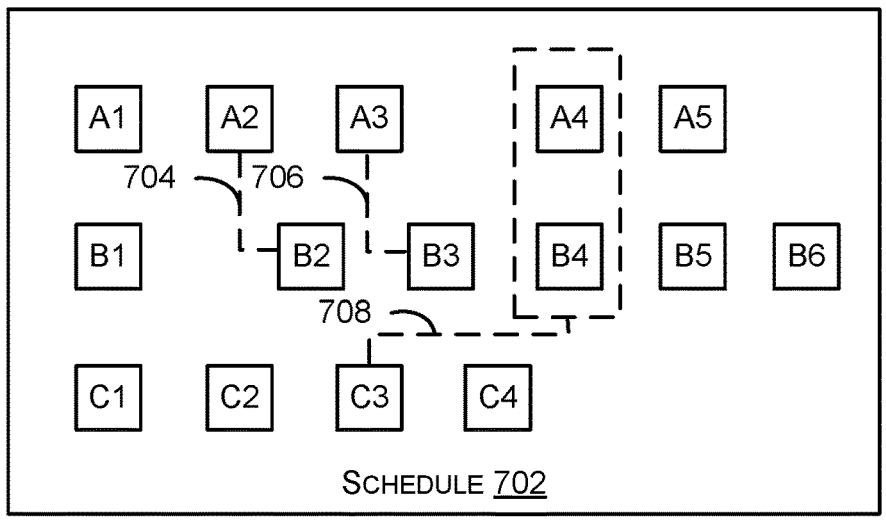
FIGS. 7A-7C illustrate example modified schedules of execution steps related to the contentions provided in FIG. 6, in accordance with at least one embodiment.
Figure 7B:
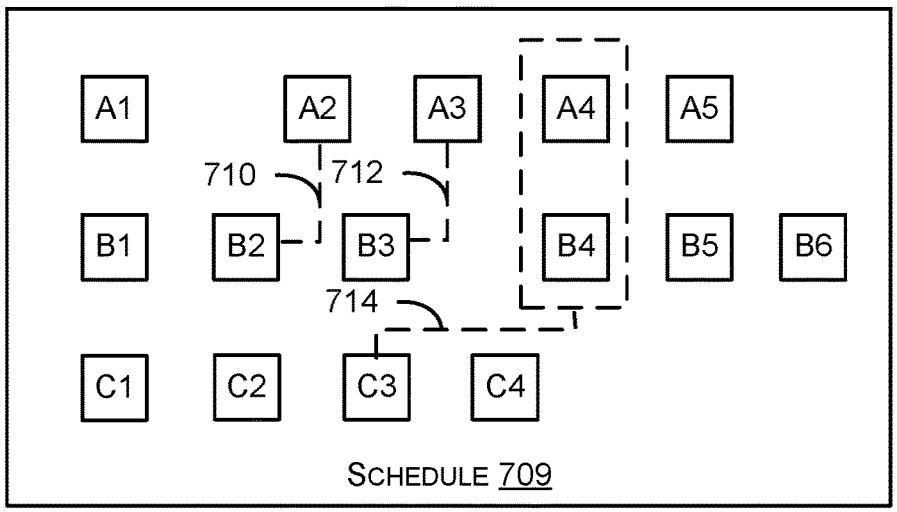

FIGS. 7A and 7B are a schematic diagrams illustrating two different examples of contention resolution, in accordance with at least one embodiment.

Continuing with the example contentions of FIG. 6, as the MDUs A, B, and C proceed to perform their respective tasks. In the example depicted in FIG. 7A, MDU A may reach the space associated with execution steps A2 and B2 before MDU B. The contention rules utilized (e.g., by the equipment coordination module 308) to determine utilization order and/or timing may dictate that the first MDU at a contended space is to be allowed to utilize the space first. Thus, the schedule 702 may be modified (e.g., by the equipment coordination module 308) to enable MDU A to utilize the space first to perform execution step A2. For example, the schedule 702 may be modified to remove an indication of contention 613 of FIG. 6 and replace it with dependency 704. Dependency 704 may indicate that MDU B is to be restricted from utilizing the contended space (e.g., location 10 of FIG. 6) until MDU A has completed execution step A2 (or is otherwise no longer utilizing the contended space).

Then MDU A may also reach the space associated with execution steps A3 and B3. The contention rules again may allow MDU A to utilize the contended space first to execute execution step A3 and the schedule 702 may be modified (e.g., by the equipment coordination module 308) to remove an indication of contention 614 of FIG. 6 and replace it with dependency 706. Dependency 706 may indicate that MDU B is to be restricted from utilizing the contended space (e.g., location 11 of FIG. 6) until MDU A has completed execution step A3 (or is otherwise no longer utilizing the contended space). In some embodiments, the dependency 706 may indicate that MDU B may utilize the contended space at the same time as MDU A so long as MDU B follow behind MDU A.

Meanwhile, MDU C may have performed execution steps C1 and C2. MDU C may reach execution step C3 before MDU A or MDU B reach execution step A4 and A5, respectively. Because MDU C has arrived first at the contention, the contention resolution rules may dictate that MDU C is to be provided use of the contended space first. Thus, the schedule 702 may be modified to remove an indication of contention 620 and replace it with dependency 708 that indicates that MDU A and MDU B are to be restricted from utilizing the contended space (e.g., locations 12-14 of FIG. 6) until MDU C has completed execution step C3 (or is otherwise no longer utilizing the contended space).

It should be appreciated that when an initial schedule of execution steps is determined and/or as the schedule is modified (e.g., to remove or insert dependencies) a component of the drive management module 102 (e.g., by the equipment coordination module 308, or any suitable module of FIG. 3) may be configured to estimate a completion time for one or more MDUs with respect to the respective task assigned to the MDU(s). As contentions are resolved, the estimation completion time may be recalculated. In some embodiments, the equipment coordination module 308 may trigger a redetermination of execution steps (e.g., by the equipment planning module 304) and/or a task assignment modification (e.g., by the task assignment module 104 of FIG. 2) based at least in part on the estimate completion time. By way of example, should a dependency associated with a particular MDU cause a delay in task completion by a threshold amount, a new route and/or alternative execution steps may be determined for the MDU to continue with its current task, a new task may be assigned to the MDU, and/or the current task assigned to the MDU may be canceled and/or assigned to another MDU (e.g., an MDU that may be able to complete the task in less time).

Another example contention resolution is depicted in FIG. 7B. As depicted in FIG. 7B, MDU B may reach the space associated with execution steps A2 and B2 before MDU A. The contention rules utilized to determine utilization order and/or timing may dictate that the first MDU at a contended space is to be allowed to utilize the space first. Thus, the schedule 709 may be modified to enable MDU B to utilize the space first to perform execution step B2. For example, the schedule 709 may be modified to remove an indication of contention 613 of FIG. 6 and replace it with dependency 710. Dependency 710 may indicate that MDU A is to be restricted from utilizing the contended space (e.g., location 10 of FIG. 6) until MDU B has completed execution step B2 (or is otherwise no longer utilizing the contended space).

Then MDU B may also reach the space associated with execution steps B3 and A3. The contention rules again may allow MDU B to utilize the contended space first to execute execution step B3 and the schedule 709 may be modified to remove an indication of contention 614 of FIG. 6 and replace it with dependency 712. Dependency 712 may indicate that MDU A is to be restricted from utilizing the contended space (e.g., location 11 of FIG. 6) until MDU B has completed execution step B3 (or is otherwise no longer utilizing the contended space). In some embodiments, the dependency 712 may indicate that MDU A may utilize the contended space at the same time as MDU B so long as MDU A follow behind MDU B.

Meanwhile, MDU C may have performed execution steps C1. When MDU C's performance reaches execution step C2, it may be determined that C is to be provided usage of the contended space first. As a result, schedule 709 may be modified to remove dependency 618 of FIG. 6. MDU C may reach execution step C3 before MDU B/MDU A reach execution step B4/A4, respectively. Because MDU C has arrived first at the contention, the contention resolution rules may dictate that MDU C is to be provided use of the contended space first. Thus, the schedule 709 may be modified to remove an indication of contention 620 and replace it with dependency 714 that indicates that MDU A and MDU B are to be restricted from utilizing the contended space (e.g., locations 12-14 of FIG. 6) until MDU C has completed execution step C3 (or is otherwise no longer utilizing the contended space).

MDU B (with MDU A following close behind) may then reach the space associated with execution steps B4 and A4. MDU B may then proceed with performing execution steps B5 and B6 and MDU A may proceed with performing execution step A5.

Figure 7C:
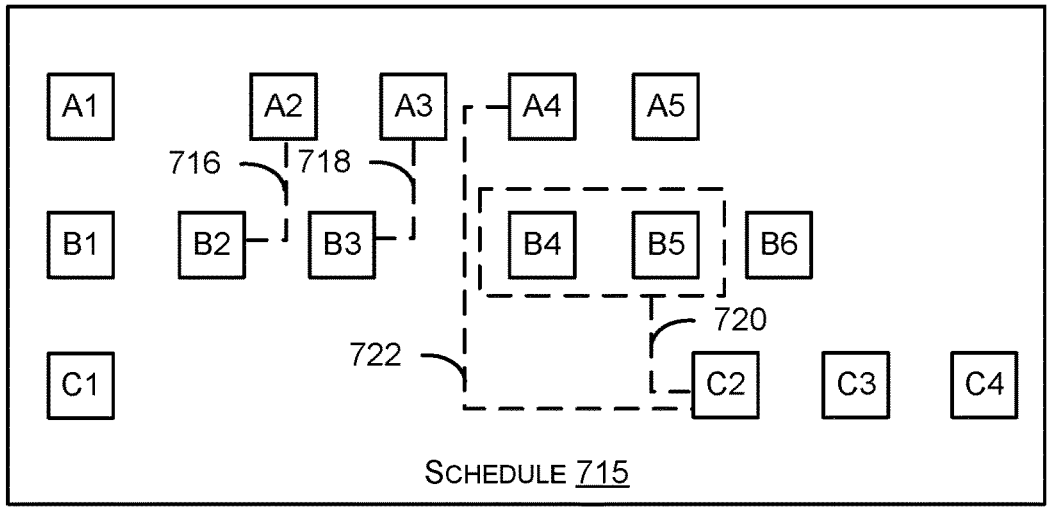

Yet another example contention resolution is depicted in FIG. 7C. As depicted in FIG. 7C, MDU B may reach the space associated with execution steps A2 and B2 before MDU A. The contention rules utilized to determine utilization order and/or timing may dictate that the first MDU at a contended space is to be allowed to utilize the space first. Thus, the schedule 715 may be modified to enable MDU B to utilize the space first to perform execution step B2. For example, the schedule 715 may be modified to remove an indication of contention 613 of FIG. 6 and replace it with dependency 716. Dependency 716 may indicate that MDU A is to be restricted from utilizing the contended space (e.g., location 10 of FIG. 6) until MDU B has completed execution step B2 (or is otherwise no longer utilizing the contended space).

Then MDU B may also reach the space associated with execution steps B3 and A3. The contention rules again may allow MDU B to utilize the contended space first to execute execution step B3 and the schedule 715 may be modified to remove an indication of contention 614 and 616 of FIG. 6 and replace them with dependency 718. Dependency 718 may indicate that MDU A is to be restricted from utilizing the contended space (e.g., location 11 of FIG. 6) until MDU B has completed execution step B3 (or is otherwise no longer utilizing the contended space). In some embodiments, the dependency 718 may indicate that MDU A may utilize the contended space at the same time as MDU B so long as MDU A follow behind MDU B.

Meanwhile, MDU C may have performed execution steps C1. When MDU C's performance reaches execution step C2, contention 622 of FIG. 6 may be considered. In some examples, it may be determined that MDU B and/or MDU A is to be provided usage of the contended space first (e.g., based on MDU B/MDU A having higher priority tasks, MDU B/MDU A arriving at the location 12 prior to MDU C arriving at location 7, etc.). As a result, schedule 715 may be modified to remove dependencies 618, 620, and/or 622 of FIG. 6 and to insert dependencies 720 and 722. Dependency 720 may indicate that MDU C to be restricted from utilizing the contended space (e.g., locations 12-15 of FIG. 6) until MDU B has completed execution steps B4 and B5 (or is otherwise no longer utilizing the contended space). Dependency 722 may indicate that MDU C is to be restricted from utilizing the contended space (e.g., locations 12-14 until MDU A has completed the execution step A4.

When MDU B exits the contended space to perform execution step B6 and MDU A exists the contended space to perform execution step A5, MDU C may be allowed to proceed executing the execution step C2.

Figure 8:
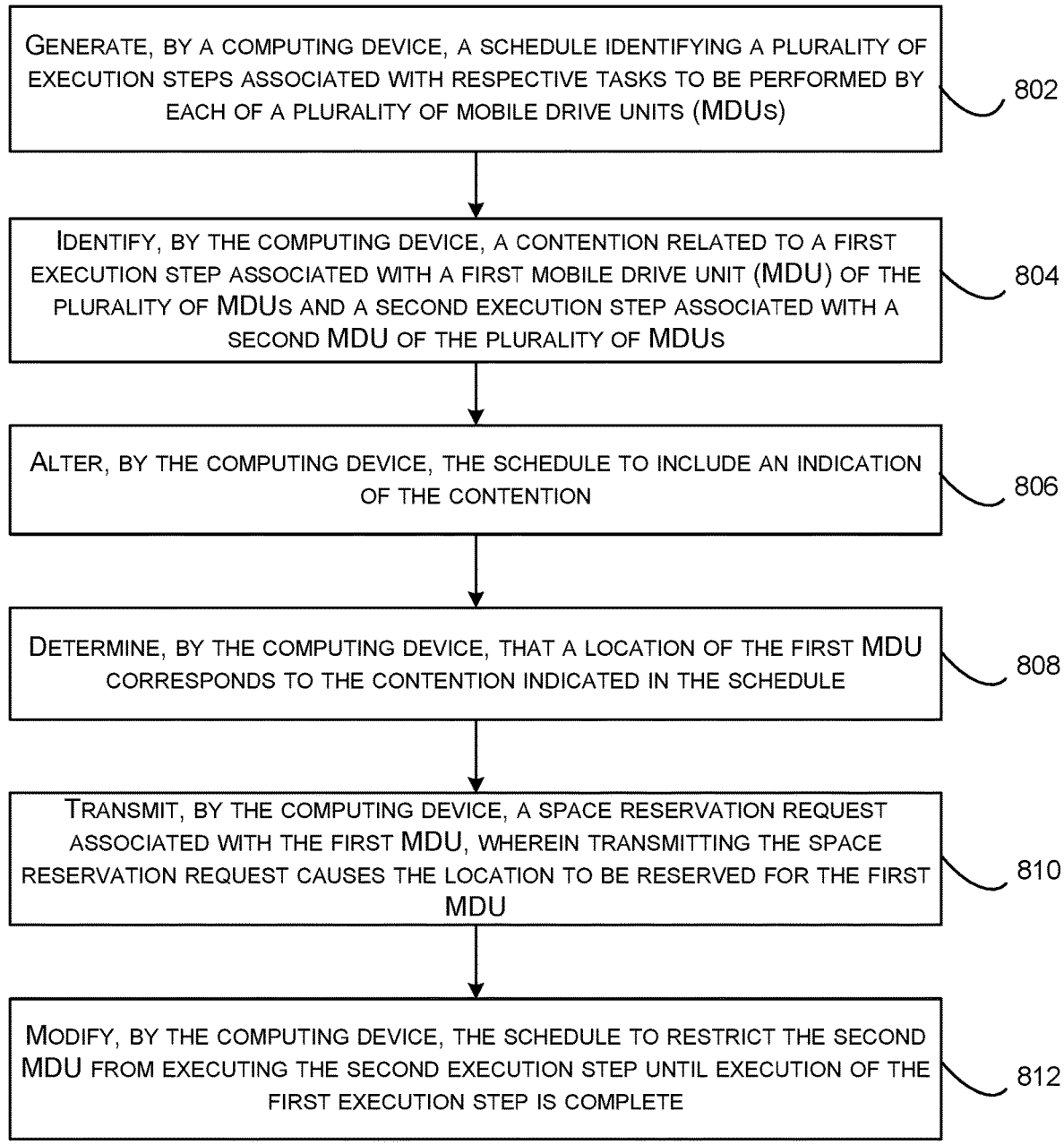
FIG. 8 is a flowchart illustrating an example method for providing contention resolution aspects of the route execution module, in accordance with at least one embodiment.

FIG. 8 is a flowchart illustrating an example method 800 for providing contention resolution aspects of the drive management module, in accordance with at least one embodiment. The method 800 may be performed by one or more components of the drive management module 102 of FIG. 3. The method 800 may performed in any suitable order. It should be appreciated that the method 800 may include a greater number or a lesser number of steps than that depicted in FIG. 8.

The method may begin at 802, where a schedule may be generated by a computing device (e.g., the execution planning module 304 of FIG. 3). The schedule may identify a plurality of execution steps associated with respective tasks to be performed by each of a plurality of mobile drive units (MDUs). The plurality of MDUs may be operating in a workspace similar to workspace 108 of FIG. 1.

At 804, a contention may be identified by a computing device (e.g., the contention identification module 306 of FIG. 3). The contention may be related to a first execution step associated with a first mobile drive unit (MDU) of the plurality of MDUs and a second execution step associated with a second MDU of the plurality of MDUs. The first execution step and the second execution step associated with the respective MDUs may include navigational operations related to speed, heading, rotational motion, and the like. The set of execution steps/operation may additionally or alternatively include steps/operations related to operating any suitable component of an MDU (e.g., mechanical devices such as conveyor belts, mechanical arm(s), onboard sensors, etc.). The set of execution steps/operation may additionally or alternatively include steps/operations for retrieving, conveying, sorting, delivering, and/or storing items within the workspace.

At 806, the schedule may be altered by a computing device (e.g., the contention identification module 306) to include an indication of the contention. By way of example, the contention identification module 306 may insert a flag, an indicator, a dependency, or the like to indicate that a contention is related to execution of one or more execution steps. For example a dependency may be inserted into the schedule to indicate that a contention exists between the first MDU and the second MDU were each respective MDU to execute the first execution step and the second execution step at relatively the same time period. The existence of a dependency may indicate to the system that the contention is to be resolved prior to execution of the first execution step and/or the second execution step.

At 808, a computing device (e.g., the equipment coordination module 308 of FIG. 3) may determine that a location of the first MDU corresponds to the contention indicated in the schedule. The equipment coordination module 308 may determine that the location of the first MDU corresponds to the contention in a number of ways. For example, the location of the MDU may be ascertained by location data provided by the MDU (e.g., from navigational sensors of the MDU) or the location of the MDU may be provided by another component of the system. As yet another example, the equipment coordination module 308 may track the progress of the first MDU as it performs its task. The equipment coordination module 308 may determine that the location of the first MDU corresponds to the contention when the next execution step in the schedule is determined to be associated with a contention (e.g., a dependency).

At 810, a space reservation request may be transmitted by a computing device (e.g., the equipment coordination module 308). The space reservation request may be associated with the first MDU. In some embodiments, transmitting the space reservation request may cause the location to be reserved for the first MDU. In some embodiments, the space reservation module 310 may reserve the space on behalf of the first MDU upon receipt of the space reservation request. When a space (e.g., a volume, a 3-dimensional area, a location, etc.) is reserved for a particular MDU (e.g., the first MDU) that MDU may utilize the space and no others.

At 812, the schedule may be modified by a computing device (e.g., the equipment coordination module 308) to restrict the second MDU from executing the second execution step until execution of the first execution step is complete. In some embodiments, the second MDU may be restricted from using the space by modifying the schedule to include a dependency associated with the second MDU and the space. This dependency may indicate, among other things, that the space is not to be utilized until the first MDU has completed the task associated with the space or is otherwise not occupying the space.

Figure 9:
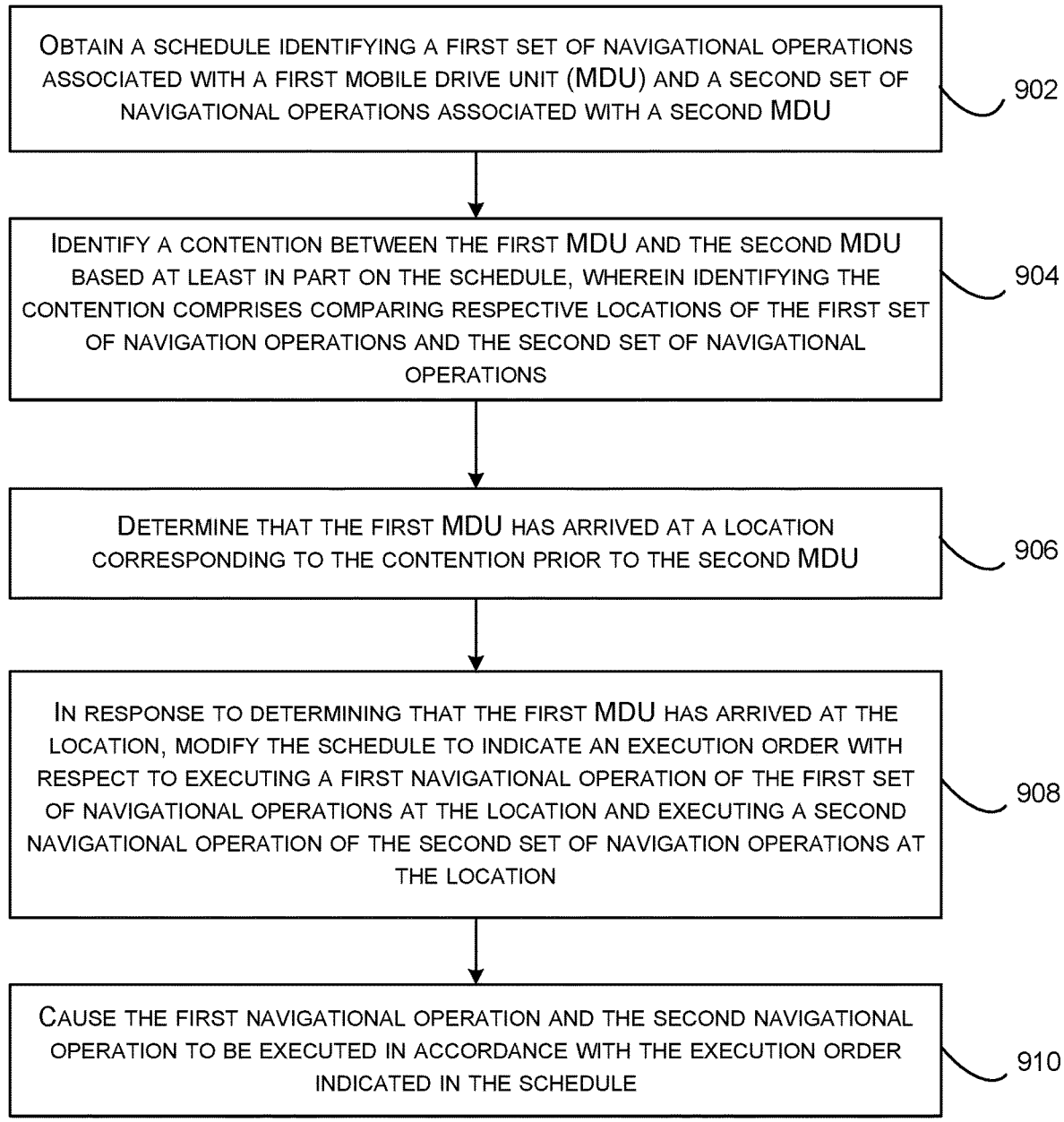
FIG. 9 is a flowchart illustrating another example method for providing contention resolution aspects of the route execution module, in accordance with at least one embodiment.

FIG. 9 is a flowchart illustrating another example method 900 for providing contention resolution aspects of the drive management module, in accordance with at least one embodiment. The method 900 may be performed by one or more components of the drive management module 102 of FIG. 3. In some embodiment, a computer-readable storage medium may comprise computer-readable instructions that, upon execution by a computer system, configure the computer system to perform the operations of the method 900. The method 900 may performed in any suitable order. It should be appreciated that the method 900 may include a greater number or a lesser number of steps than that depicted in FIG. 9.

The method 900 may begin at 902, where a schedule may be obtained (e.g., by the contention identification module 306 of FIG. 3). The schedule may identify a first set of navigational operations associated with a first mobile drive unit (MDU) and a second set of navigational operations associated with a second MDU. The first and second set of navigational operations may include operations related to speed, heading, rotational motion, and the like of the respective MDUs.

At 904, a contention between the first MDU and the second MDU may be identified (e.g., by the contention identification module 306) based at least in part on the schedule. In at least one embodiment, identifying the contention may comprise comparing respective locations associated with the first set of navigation operations and the second set of navigational operations.

At 906, it may be determined (e.g., by the equipment coordination module 308 of FIG. 3) that that first MDU has arrived at a location corresponding to the contention prior to the second MDU. The equipment coordination module 308 may determine that respective locations of the first MDU and the second MDU in a number of ways. For example, the locations of the respective MDUs may be ascertained by location data provided by the respective MDUs (e.g., from navigational sensors of each of the MDU) or the location of the respective MDUs may be provided by another component of the system. As yet another example, the equipment coordination module 308 may track the progress of the first MDU and the second MDU as the respective MDUs perform their respective tasks. The equipment coordination module 308 may determine that the first MDU has arrive at the location corresponding to the contention prior to the second MDU by either comparing respective locations or by determining that the next execution step to be performed by the first MDU is associated with contention while the second MDU is still performing operations related to an earlier task.

At 908, in response to determining that the first MDU has arrived at the location, the schedule may be modified (e.g., by the equipment coordination module 308) to indicate an execution order (and/or timing) with respect to executing a first navigational operation of the first set of navigational operations at the location and executing a second navigational operation of the second set of navigation operations at the location. By way of example, the equipment coordination module 308 may remove any pre-existing dependencies that indicated an association between the contention/location and the first and/or second MDU. The equipment coordination module 308 may further modify the schedule to include a dependency that indicates that the second MDU is restricted from utilizing the location until the first MDU has completed execution of the first navigational operation.

At 910, the equipment coordination module 308 may cause the first navigational operation and the second navigational operation to be executed in accordance with the execution order (and/or timing) indicated in the schedule. For example, the equipment coordination module 308 (or multiple equipment coordination modules) may submit space reservation requests on behalf of the first MDU and/or the second MDU to reserve space for each MDU to perform the first and second navigational operations at the location. The space reservation requests may be submitted according to the schedule in that a space reservation request for the first MDU may be submitted first. When the equipment coordination module 308 (or another equipment coordination module) determines that the first MDU is no longer utilizing the space, the equipment coordination module 308 may submit another space reservation request on behalf of the second MDU to reserve the space for the second MDU to perform its navigational operations.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
a plurality of mobile drive units (MDUs) configured for material transportation within a workspace; and
a drive management module configured to manage motion of the plurality of MDUs within the workspace, the drive management module communicatively coupled with the plurality of MDUs over a data network, the drive management module comprising:
a processor; and
a memory storing computer-readable instructions that, upon execution by the processor, configure the drive management module to:
generate a schedule identifying first execution steps associated with first tasks performable by a first MDU of the plurality of MDUs and second execution steps associated with second tasks performable by a second MDU of the plurality of MDUs, the first execution steps and the second execution steps scheduled to be performed over a first time period;
transmit, in accordance with the schedule, instructions to the first MDU to execute a set of executions steps from the first execution steps;
identify a subset of the first execution steps and the second execution steps from the schedule, the subset being associated with a second time period, the second time period being shorter than the first time period;
identify a potential contention related to a first execution step and a second execution step of the subset, the first execution step being associated with a first MDU and the second execution step being associated with a second MDU;
modify the schedule to include an indication of the potential contention;
receive location information identifying a location of the first MDU;
determine that the location of the first MDU corresponds to the potential contention indicated in the schedule;
transmit, on behalf of the first MDU, a space reservation request associated with the first MDU, wherein transmitting the space reservation request causes the location to be reserved for the first MDU;
modify the schedule to indicate an execution order with respect to executing the first execution step and the second execution step; and
enforce the execution order based on transmitting instructions to the first MDU and the second MDU to perform the first execution step and the second execution step in accordance with the modified schedule.

2. The system of claim 1, wherein the computer-readable instructions further configure the drive management module to:
receive a task schedule associated with the plurality of MDUs, the task schedule identifying the respective tasks to be performed by each of the plurality of MDUs over the first time period, wherein the schedule is generated utilizing the task schedule, and wherein the first execution steps and the second execution steps individually comprise a navigational operation of a respective MDU.

3. The system of claim 1, wherein the drive management module comprises an execution planning module and a contention identification module, wherein the execution planning module is configured to generate the schedule and identify the subset of the first execution steps and the second execution steps from the schedule, and wherein the contention identification module is configured to identify the potential contention related to the first execution step and the second execution step of the subset and modify the schedule to include the indication of the potential contention.

4. The system of claim 3, wherein the route execution module comprises at least one equipment coordinator module configured to receive the location information identifying the location of the first MDU, determine the location of the first MDU corresponds to the potential contention, transmit the space reservation request associated with the first MDU, and provide instructions to at least one of the first MDU or the second MDU to perform the first execution step or the second execution step in accordance with the modified schedule.

5. A computer-implemented method, comprising:
generating, by a computing device, a schedule identifying a plurality of execution steps associated with respective tasks to be performed by each of a plurality of mobile drive units (MDUs);
transmitting, by the computing device in accordance with the schedule, instructions to each of the plurality of MDUs to perform at least a portion of the plurality of execution steps associated with the respective tasks;
identifying, by the computing device, a potential contention related to a first execution step associated with a first mobile drive unit (MDU) of the plurality of MDUs and a second execution step associated with a second MDU of the plurality of MDUs;
altering, by the computing device, the schedule to include an indication of the potential contention;
determining, by the computing device, that a location of the first MDU corresponds to the potential contention indicated in the schedule;
transmitting, by the computing device on behalf of the first MDU, a space reservation request associated with the first MDU, wherein transmitting the space reservation request causes the location to be reserved for the first MDU; and
modifying, by the computing device, the schedule to indicate an execution order for executing the first execution step and the second execution step.

6. The computer-implemented method of claim 5, further comprising executing the first execution step and the second execution step according to the modified schedule, wherein the first execution step and the second execution step individually comprise at least one navigational operation of a respective MDU.

7. The computer-implemented method of claim 5, wherein modifying the schedule to restrict the second MDU from executing the second execution step until execution of the first execution step is complete is performed based at least in part on the first MDU arriving at the location corresponding to the potential contention prior the second MDU arriving at the location.

8. The computer-implemented method of claim 5, wherein identifying the potential contention related to a first execution step and the second execution step comprises:
identifying a portion of the schedule;
identifying a first set of execution steps of the first MDU to be performed within the portion of the schedule;
identifying a second set of execution steps of the second MDU to be performed within the portion of the schedule;

comparing the first set of execution steps to the second set of execution steps; and identifying an area of overlap based at least in part on comparing the first set of execution steps to the second set of execution steps, wherein the area of overlap comprises the potential contention.

9. The computer-implemented method of claim 8, wherein identifying the area of overlap comprises determining that a first location of the first set of execution steps matches a second location of the second set of execution steps.

10. The computer-implemented method of claim 5, further comprising:
    determining, by the computing device, that the second MDU is located at the location corresponding to the potential contention, the second MDU arriving at the location prior to the first MDU;
    determining that the first MDU is associated with a first task having a first priority; and
    determining that the second MDU is associated with a second task having a second priority, wherein modifying the schedule to restrict the second MDU from executing the second execution step until execution of the first execution step is complete is further based at least in part on the second priority being a lower priority than the first priority.

11. The computer-implemented method of claim 5, further comprising:
    determining, by the computing device, that a user device is located at a particular location corresponding to at least one of the plurality of execution steps associated with the respective tasks to be performed by each of a plurality of MDUs; and
    restricting one or more execution steps of one or more of the plurality of MDUs based at least in part on the user device being located at the particular location.

12. The computer-implemented method of claim 11, wherein restricting one or more execution steps of the one or more of the plurality of MDUs comprises modifying the schedule to include one or more dependencies, the one or more dependencies indicating that a corresponding execution step is not to be executed until the user device is no longer located at the particular location.

13. A computer-readable storage medium comprising computer-readable instructions that, upon execution by a computer device, configure the computer device to perform operations comprising:
    obtaining, by the computer device, a schedule identifying a first set of navigational operations associated with a first mobile drive unit (MDU) and a second set of navigational operations associated with a second MDU;
    instructing, by the computing device according to the schedule, the first MDU to perform at least a portion of the navigational operations;
    identifying a potential contention between the first MDU and the second MDU based at least in part on the schedule, wherein identifying the potential contention comprises comparing respective locations of the first set of navigation operations and the second set of navigational operations;
    determining that the first MDU has arrived at a location corresponding to the potential contention prior to the second MDU;
    in response to determining that the first MDU has arrived at the location, modifying the schedule to indicate an execution order with respect to executing a first navigational operation of the first set of navigational operations at the location and executing a second navigational operation of the second set of navigation operations at the location; and
    instructing the first MDU and the second MDU to perform the first navigational operation and the second navigational operation in accordance with the execution order indicated in the schedule.

14. The computer-readable storage medium of claim 13, further comprising:
    determining a first priority associated with a first task assigned to the first MDU and a second priority associated with a second task assigned to the second MDU; and
    determining the execution order based at least in part on determining that the first MDU has arrived at the location prior to the second MDU, wherein the execution order is determined further based at least in part on the first priority and the second priority.

15. The computer-readable storage medium of claim 13, wherein the execution order is determined further based at least in part on respective speeds of the first MDU and the second MDU.

16. The computer-readable storage medium of claim 13, wherein the first navigational operation is related to rotational motion or forward motion of the first MDU.

17. The computer-readable storage medium of claim 13, further comprising:
    modifying the schedule such that the second navigational operation is to be executed with respect to a current location of the first MDU; and
    instructing the second MDU to execute one or more navigational operations according to the current location of the first MDU.

18. The computer-readable storage medium of claim 17, wherein instructing the second MDU to execute the one or more navigational operations according to the current location of the first MDU causes the second MDU to follow the first MDU for a period of time.

19. The computer-readable storage medium of claim 13, wherein modifying the schedule to indicate an execution order causes a timing at which the second set of navigational operations are executed to be altered.

20. The computer-readable storage medium of claim 13, wherein instructing the first MDU and the second MDU to perform the first navigational operation and the second navigational operation in accordance with the execution order indicated in the schedule comprises:
    transmitting, by the computer device according to the schedule, a first space reservation request corresponding to the first navigational operation to a space allocator computer, the computer device being separate from the first MDU;
    receiving a first space reservation response indicating that the first space reservation request was granted;
    instructing the first MDU to perform the navigational operation based on the first space reservation response;
    transmitting, by the computer device according to the schedule, a second space reservation request corresponding to the second navigational operation to the space allocator computer, the computer device being separate from the second MDU;
    receiving a second space reservation response indicating that the second space reservation request was granted; and instructing the second MDU to execute the navigational operation based at least in part on the second space reservation request.

\* \* \* \* \*